United States Patent
Furusho et al.

(10) Patent No.: US 9,380,799 B2
(45) Date of Patent: Jul. 5, 2016

(54) ROASTED MIXTURE AND METHOD FOR PRODUCING A BEVERAGE USING SAME

(75) Inventors: Tomonobu Furusho, Hiratsuka (JP); Tadahiro Hiramoto, Yokohama (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 140 days.

(21) Appl. No.: 14/004,368

(22) PCT Filed: Mar. 9, 2012

(86) PCT No.: PCT/JP2012/056111
§ 371 (c)(1),
(2), (4) Date: Sep. 10, 2013

(87) PCT Pub. No.: WO2012/124624
PCT Pub. Date: Sep. 20, 2012

(65) Prior Publication Data
US 2013/0344225 A1    Dec. 26, 2013

(30) Foreign Application Priority Data
Mar. 11, 2011    (JP) ................................. 2011-054070

(51) Int. Cl.
| | | |
|---|---|---|
| A23F 5/14 | (2006.01) | |
| A23F 5/24 | (2006.01) | |
| A23F 5/44 | (2006.01) | |
| A23F 5/02 | (2006.01) | |
| A23F 5/04 | (2006.01) | |
| A23F 5/46 | (2006.01) | |

(52) U.S. Cl.
CPC ... *A23F 5/14* (2013.01); *A23F 5/02* (2013.01); *A23F 5/04* (2013.01); *A23F 5/24* (2013.01); *A23F 5/44* (2013.01); *A23F 5/465* (2013.01)

(58) Field of Classification Search
CPC ............... A23F 5/02; A23F 5/04; A23F 5/14; A23F 5/24; A23F 5/44; A23F 5/465
See application file for complete search history.

(56) References Cited

U.S. PATENT DOCUMENTS

| | | | |
|---|---|---|---|
| 4,142,002 A | | 2/1979 | Spotholz et al. |
| 4,188,409 A | * | 2/1980 | Kay ................................. 426/78 |
| 5,676,993 A | * | 10/1997 | Watterson et al. ............ 426/533 |
| 6,171,635 B1 | * | 1/2001 | Zhao .............................. 426/596 |
| 2001/0026830 A1 | * | 10/2001 | Barahona ....................... 426/596 |
| 2005/0031761 A1 | | 2/2005 | Brucker et al. |
| 2008/0057161 A1 | | 3/2008 | Brucker et al. |
| 2008/0057162 A1 | | 3/2008 | Brucker et al. |

FOREIGN PATENT DOCUMENTS

| | | |
|---|---|---|
| CN | 101161089 A | 4/2008 |
| GB | 325039 | 2/1930 |
| JP | 54-151171 A | 11/1979 |
| JP | 59-006869 A | 1/1984 |
| JP | 59-146576 A | 8/1984 |
| JP | 61-067443 A | 4/1986 |
| JP | 04-152845 A | 5/1992 |
| JP | 2000-050800 A | 2/2000 |
| JP | 2005-102594 A | 4/2005 |
| JP | 2006-081451 A | 3/2006 |
| WO | 03049549 A1 | 6/2003 |
| WO | 2010014846 A1 | 2/2010 |
| WO | WO 2010069733 * | 6/2010 |

OTHER PUBLICATIONS

European Patent Office, Communication dated Nov. 13, 2014, issued in counterpart European Patent Application No. 12757673.4.
Ian Wolfe, "Chestnuts", La Cucina Italiana, Dec. 2008, Internet, http://lacucinaitalianamagazine.com/ingredients/chestnuts.
Emilio Cepeda, et al., "Water sorption isotherms of roasted coffee and coffee roasted with sugar", International Journal of Food Science & Technology, 1999, pp. 287-290, vol. 34.

* cited by examiner

*Primary Examiner* — Anthony Weier
(74) *Attorney, Agent, or Firm* — Sughrue Mion, PLLC

(57) ABSTRACT

The present invention pertains to a coffee extract rich in variety and in which the features of coffee are enhanced. A roasted product prepared by following a step for mixing and roasting coffee beans with at least one material selected from among oolong tea, pu'erh tea, red tea, roses, jasmine, hops, hibiscus, lemon grass, the berries of Japanese pepper, rosemary, vanilla, sugar beets, Kombu, Azuki beans, kidney beans, peas, soy beans, almonds, cashew nuts, chestnuts, pumpkin seeds, sweet chestnuts, walnuts, sesame, sunflower seeds, hazel nuts, pecan nuts, macadamia nuts, pine nuts, peanuts, rice, barley, malt, buckwheat grains, Job's tears, mandarin orange peels, orange peels, Kabosu peels, grapefruit peels, Sudachi peels, Yuzu peels, lime peels, lemon peels, blueberries, prunes, cherries, Japanese persimmons, pineapple, bananas, grapes, mangoes, peaches, apples, black peppers, chili peppers, sugar cane, ginger, garlic, onions, carrots, burdock roots, pumpkins, sweet potatoes, potatoes, and corn.

11 Claims, 18 Drawing Sheets

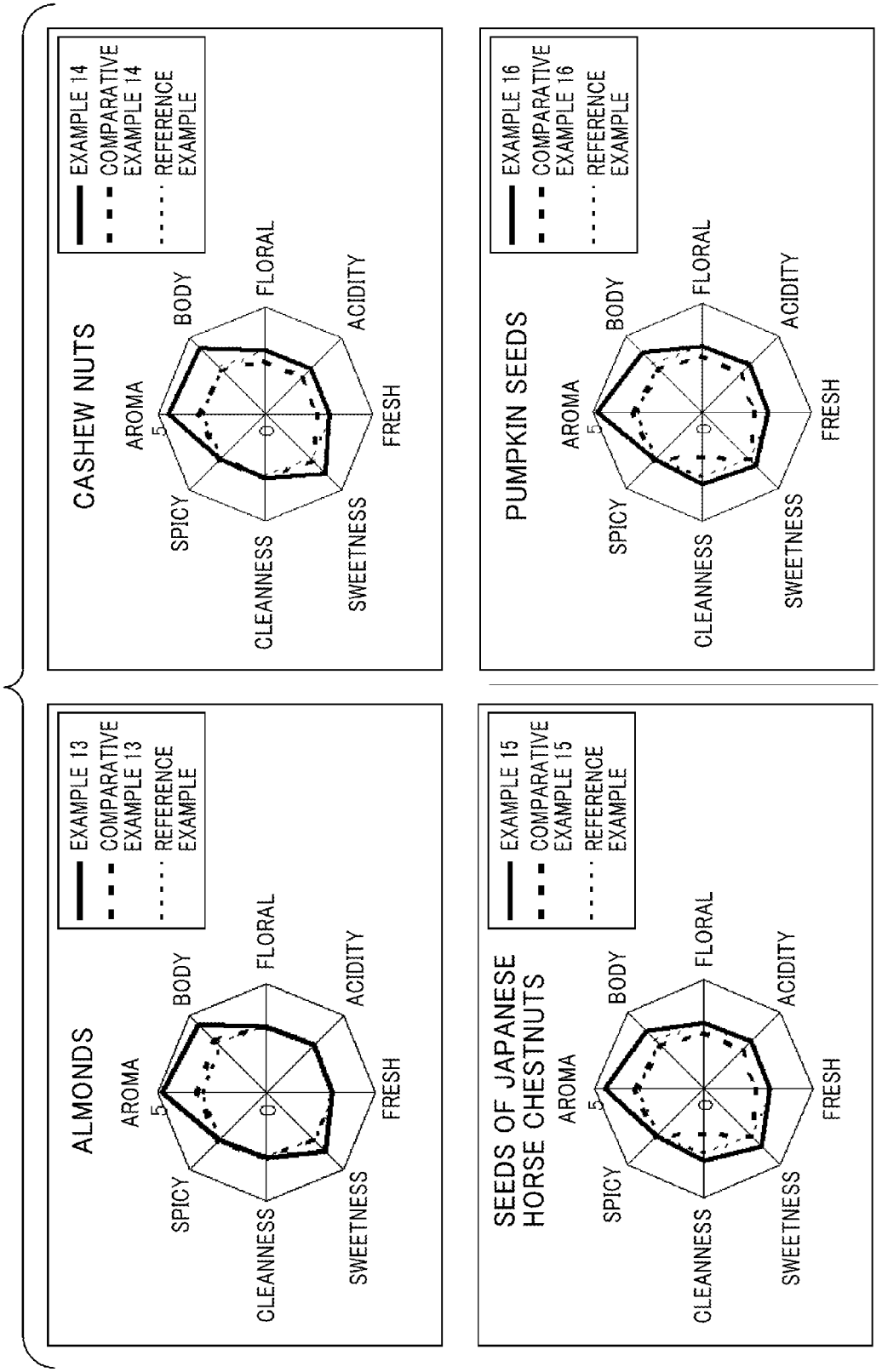

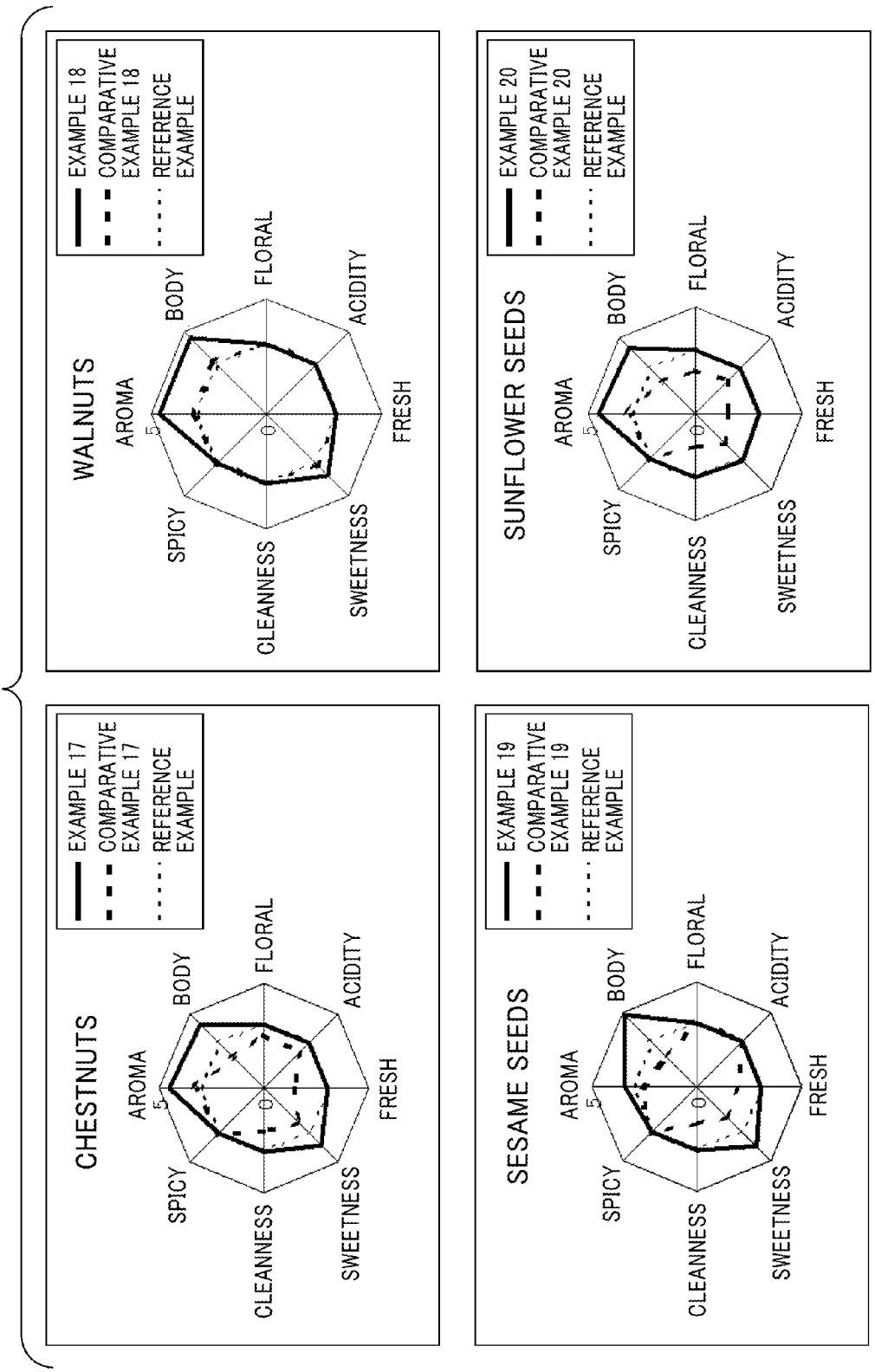

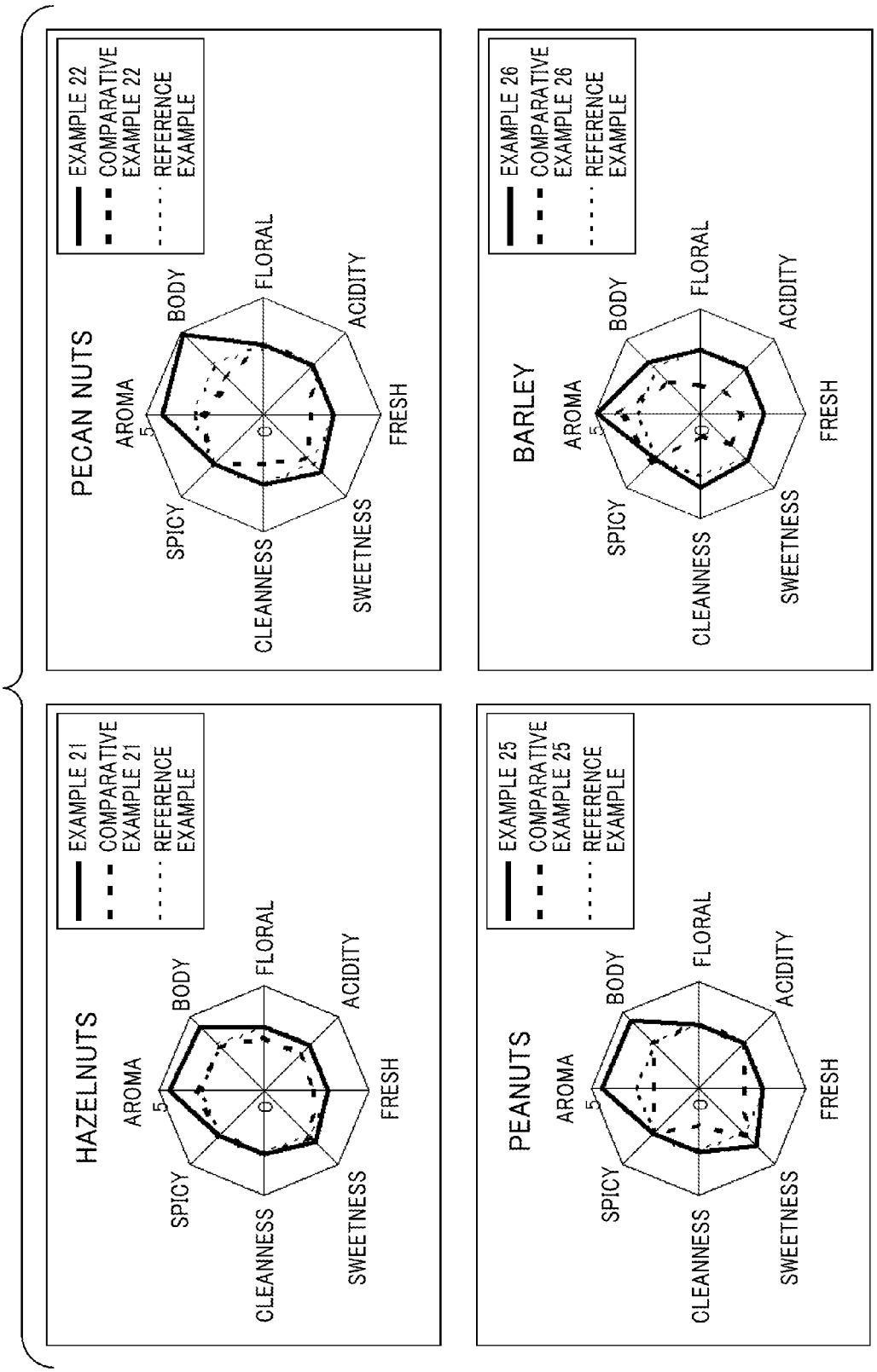

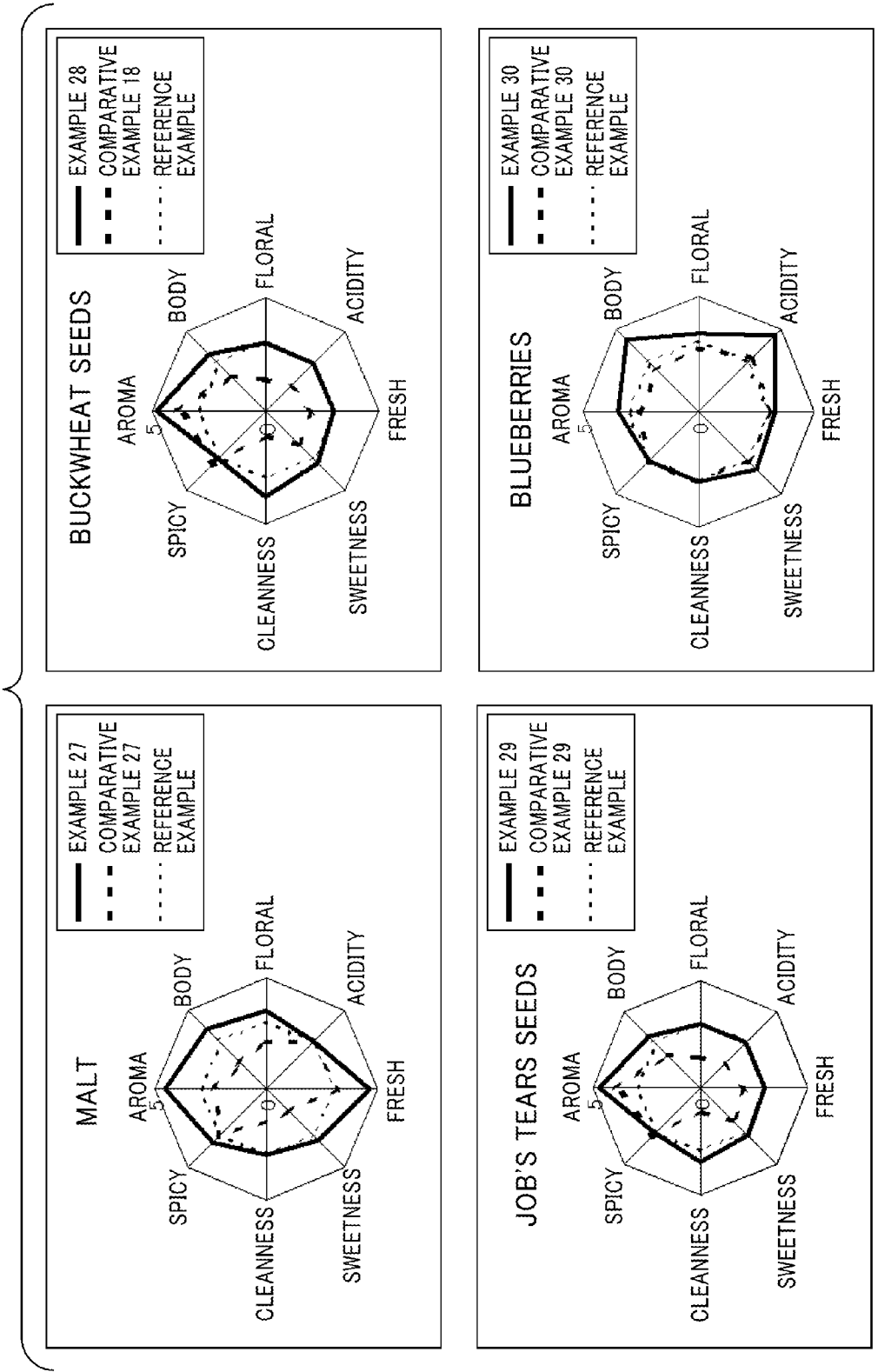

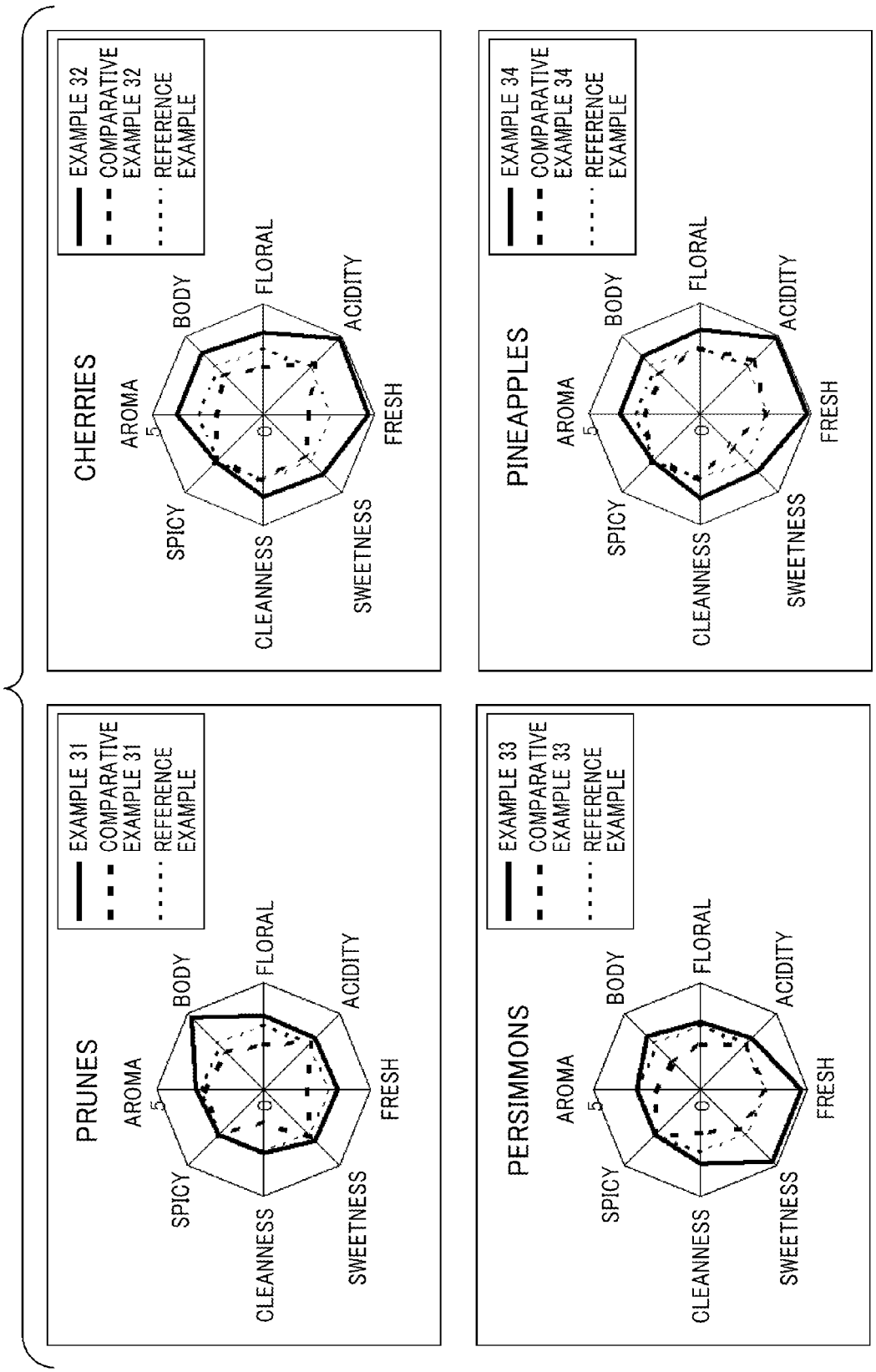

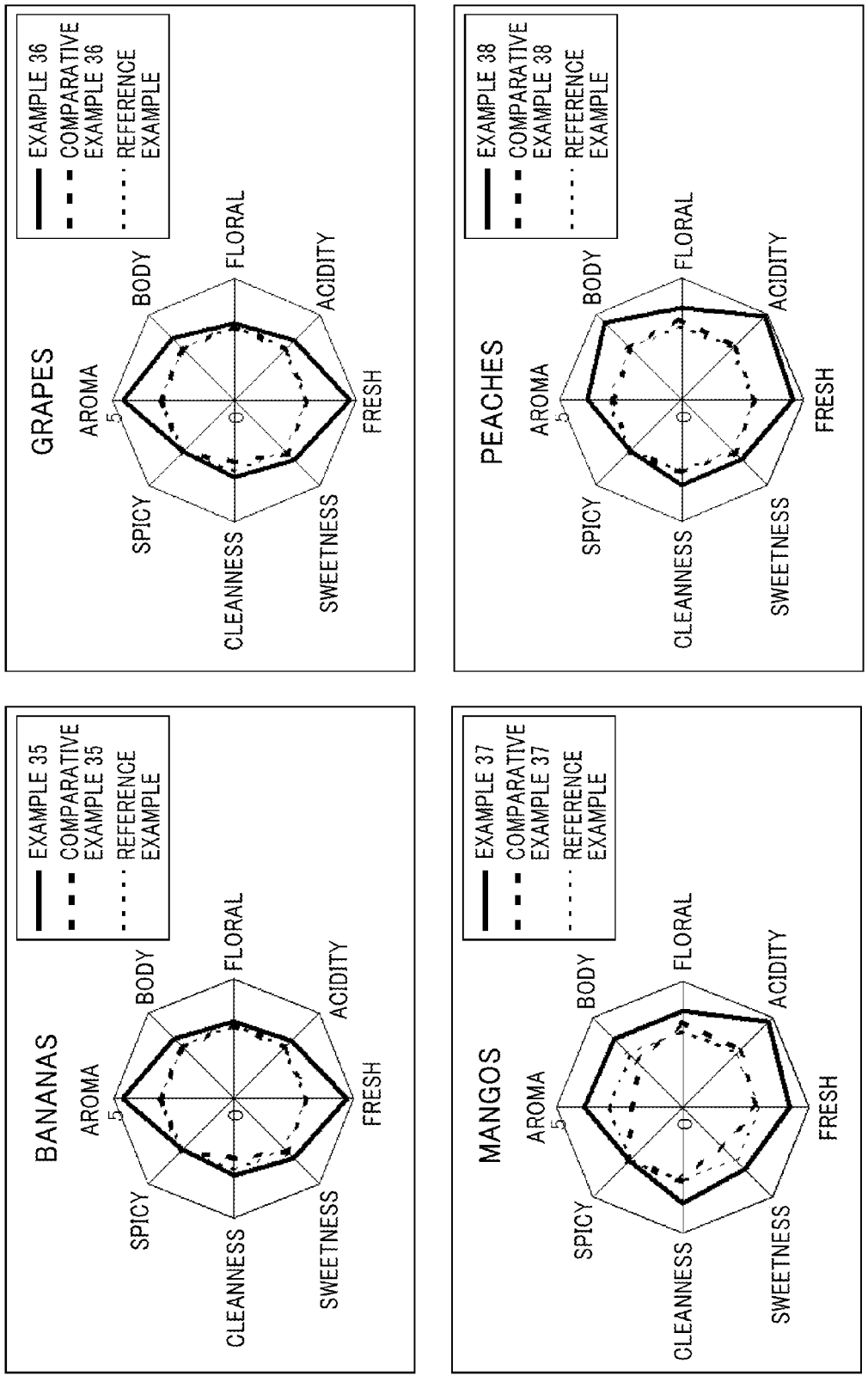

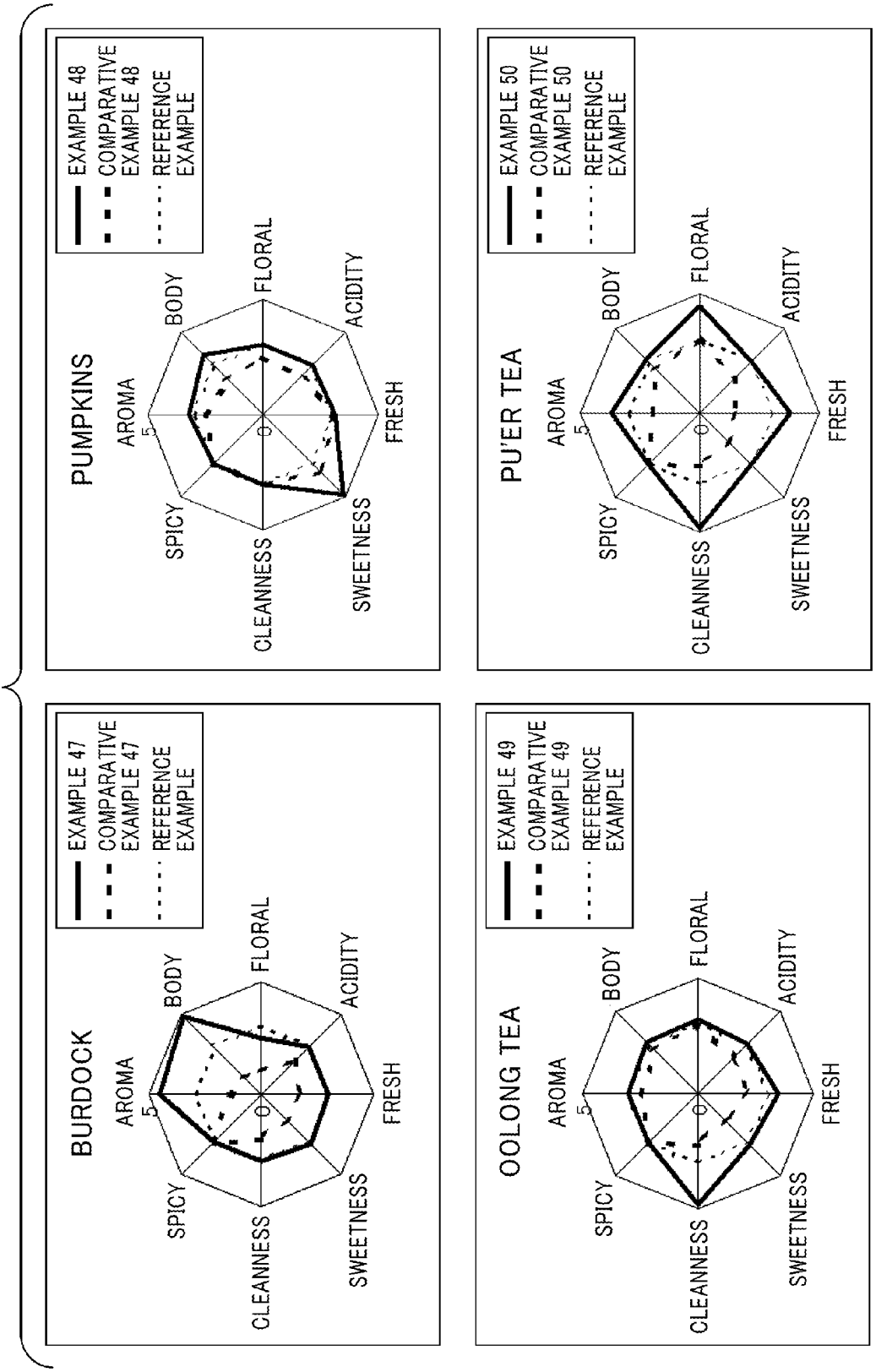

US 9,380,799 B2

ROASTED MIXTURE AND METHOD FOR PRODUCING A BEVERAGE USING SAME

TECHNICAL FIELD

The present invention relates to various coffee extracts whose coffee characteristics are enhanced.

BACKGROUND ART

In the field of coffee beverages, there have been known various methods of adjusting a flavor and an aroma in accordance with consumer tastes. Japanese Patent Application Publication No. Hei 4-152845 has disclosed soybean-blended coffee having a new flavor and a new aroma, which is obtained by grinding a mixture of coffee beans and soybeans which are separately roasted. For the purpose of obtaining new beverage with roast flavor, Japanese Patent Application Publication No. Sho 59-146576 has described a method of obtaining the extract by extracting from a mixture of roasted and ground coffee beans and roasted barley with hot water or the like. For the purpose of obtaining beverage with roast flavor, Japanese Patent Application Publication No. Sho 59-6869 has described a method of obtaining the extract by extracting from a mixture of roasted and ground coffee beans and roasted barley, roasted Job's tears seeds, or roasted green tea with water or the like. In addition to these methods, some methods of obtaining the extract from mixtures of roasted and ground coffee beans and various materials have been known (see Japanese Patent Application Publication No. Sho 54-151171 and Japanese Patent Application Publication No. 2005-102594).

SUMMARY OF INVENTION

However, none of beverages from mixtures of separately roasted raw materials as mentioned above has reached a satisfactory level in terms of the flavor and taste. An object of the present invention is to provide various coffee extracts which having enhanced various coffee characteristics for satisfying a wide range of customers.

As a result of earnest studies for the purpose of solving the above-mentioned problems, the inventors have found it possible to obtain various coffee extracts by roasting specific materials together with coffee beans. To be specific, the present invention provides roasted mixtures made through a process of roasting a mixture of coffee beans and at least one material selected from a group consisting of oolong tea, pu'er tea, black tea, roses, jasmine, hops, hibiscuses, lemongrass, berries of sansho (Japanese pepper), rosemary, vanilla, sugar beets, kelps, adzuki beans, kidney beans, peas, soybeans, almonds, cashew nuts, seeds of Japanese horse chestnuts, pumpkin seeds, chestnuts, walnuts, sesame seeds, sunflower seeds, hazelnuts, pecan nuts, macadamia nuts, pine nuts, peanuts, rice, barley, malt, buckwheat seeds, Job's tears seeds, mandarin orange peels, orange peels, peels of kabosu (a type of Japanese citrus fruit), grapefruit peels, peels of sudachi (another type of Japanese citrus fruit), peels of yuzu (a species of aromatic Asiatic citron), lime peels, lemon peels, blueberries, prunes, cherries, persimmons, pineapples, bananas, grapes, mangos, peaches, apples, pepper, red pepper, sugar cane, ginger, garlic, onions, carrots, burdock, pumpkins, sweet potatoes, potatoes and corn.

In addition, the present invention provides extracts obtained by extracting from the above-mentioned roasted mixture.

Furthermore, the present invention provides beverages which include some of the above-mentioned extracts.

The present invention is intended to enhance the coffee characteristics. What is called "flavored coffee" (for example, vanilla coffee (coffee to which a vanilla flavor is added)), which is obtained by adding a flavor to coffee, does not aim to enhance the coffee characteristics, and is in different technical field. The present invention provides a technique of blending and roasting specific materials with a mixture ratio in a specific range and under a specific roasting condition to provide coffee, even having some of coffee characteristics enhanced, having a natural taste and aroma with a sense of unity which cannot be obtained by simple blending of an additional material, without losing the flavor balance of the coffee.

The present invention can provide coffee extracts which satisfy various tastes. For example, in a case where a coffee extract with enhanced sweetness and enhanced acidity is desired, two extracts may be blended together. One extract is that (a coffee extract with enhanced sweetness) which is extracted from a roasted mixture obtained by roasting a mixture of vanilla beans and coffee beans. The other extract is that (a coffee extract with enhanced acidity) which is extracted from a roasted mixture obtained by roasting a mixture of orange peels and coffee beans.

BRIEF DESCRIPTION OF DRAWINGS

FIG. 2(a) and FIG. 2(b) show evaluations of the characteristics of extracts obtained from roasted mixtures of Examples 9 to 16, Reference Example, and Comparative Examples 9 to 16.

FIG. 3(a) and FIG. 3(b) show evaluations of the characteristics of extracts obtained from roasted mixtures of Examples 17 to 22, and 26, Reference Example, and Comparative Examples 17 to 22, 25 and 26.

FIG. 4(a) and FIG. 4(b) show evaluations of the characteristics of extracts obtained from roasted mixtures of Examples 27 to 34, Reference Example, and Comparative Examples 27 to 34.

FIG. 5(a) and FIG. 5(b) show evaluations of the characteristics of extracts obtained from roasted mixtures of Examples 35 to 42, Reference Example, and Comparative Examples 35 to 42.

FIG. 6(a) and FIG. 6(b) show evaluations of the characteristics of extracts obtained from roasted mixtures of Examples 43 to 50, Reference Example, and Comparative Examples 43 to 50.

DESCRIPTION OF EMBODIMENTS

Figure 1A:
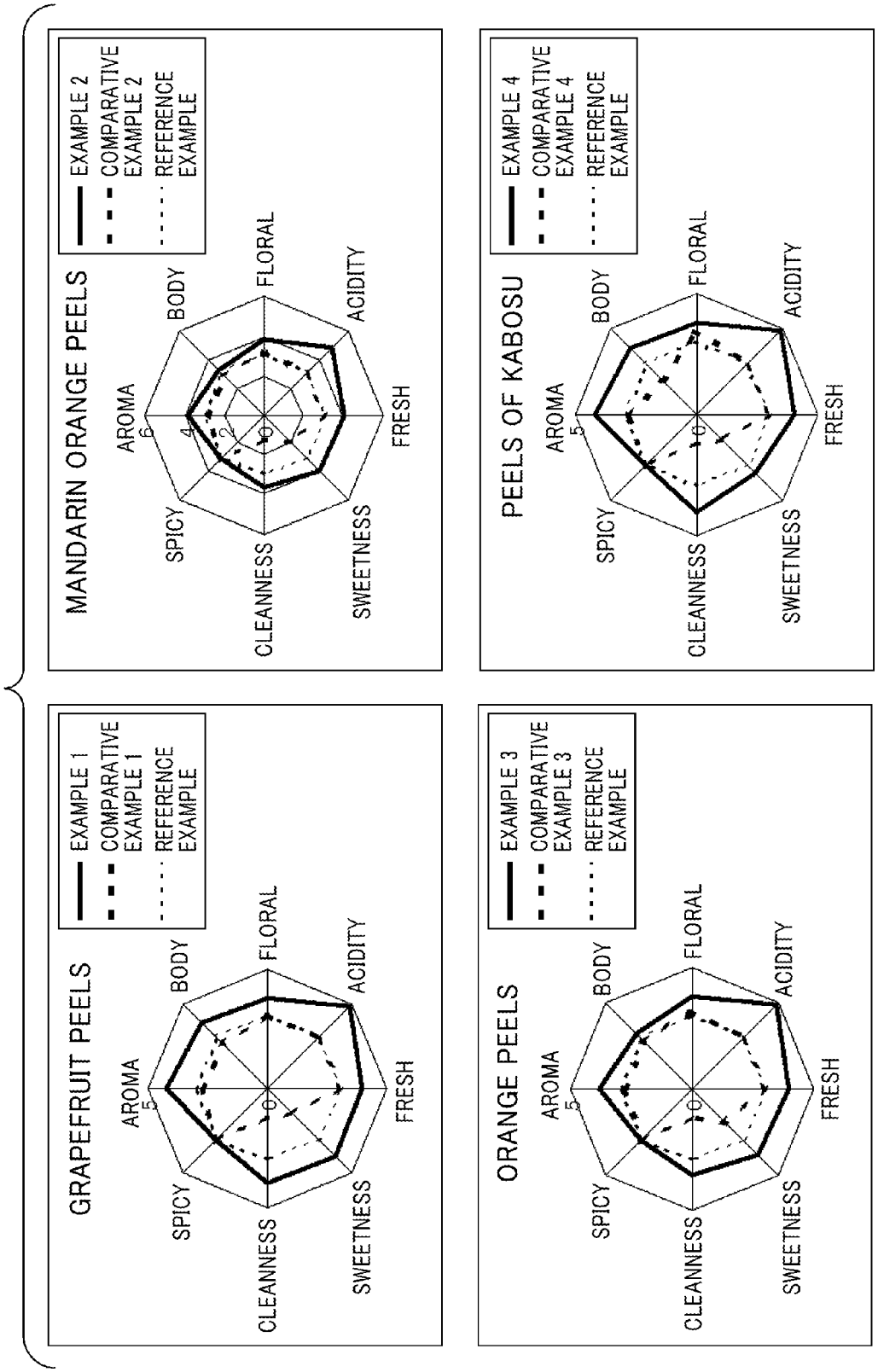
FIG. 1(a) and FIG. 1(b) show evaluations of the characteristics of extracts obtained from roasted mixtures of Examples 1 to 8, Reference Example, and Comparative Examples 1 to 8.
Figure 1B:
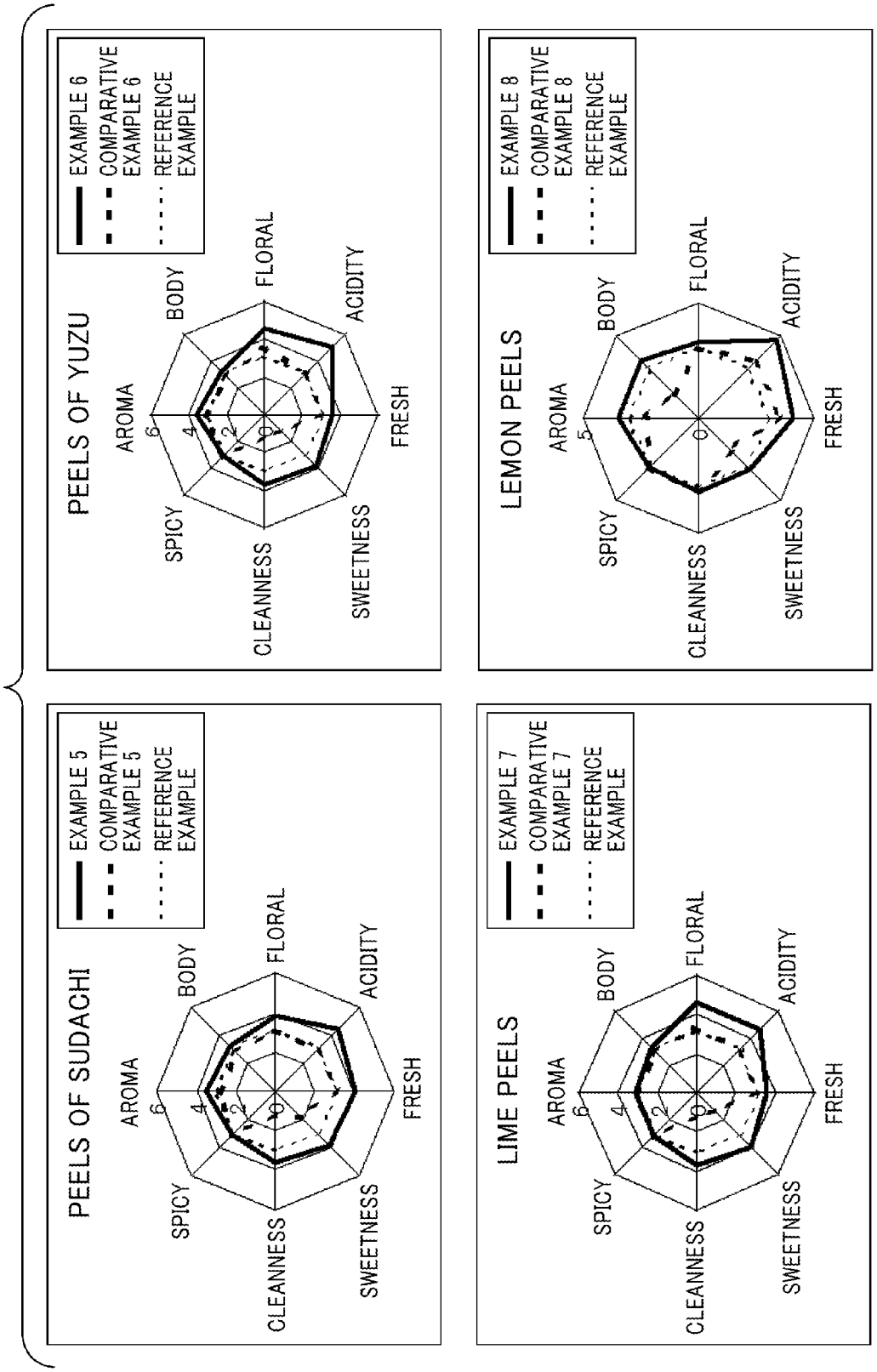
Figure 2A:
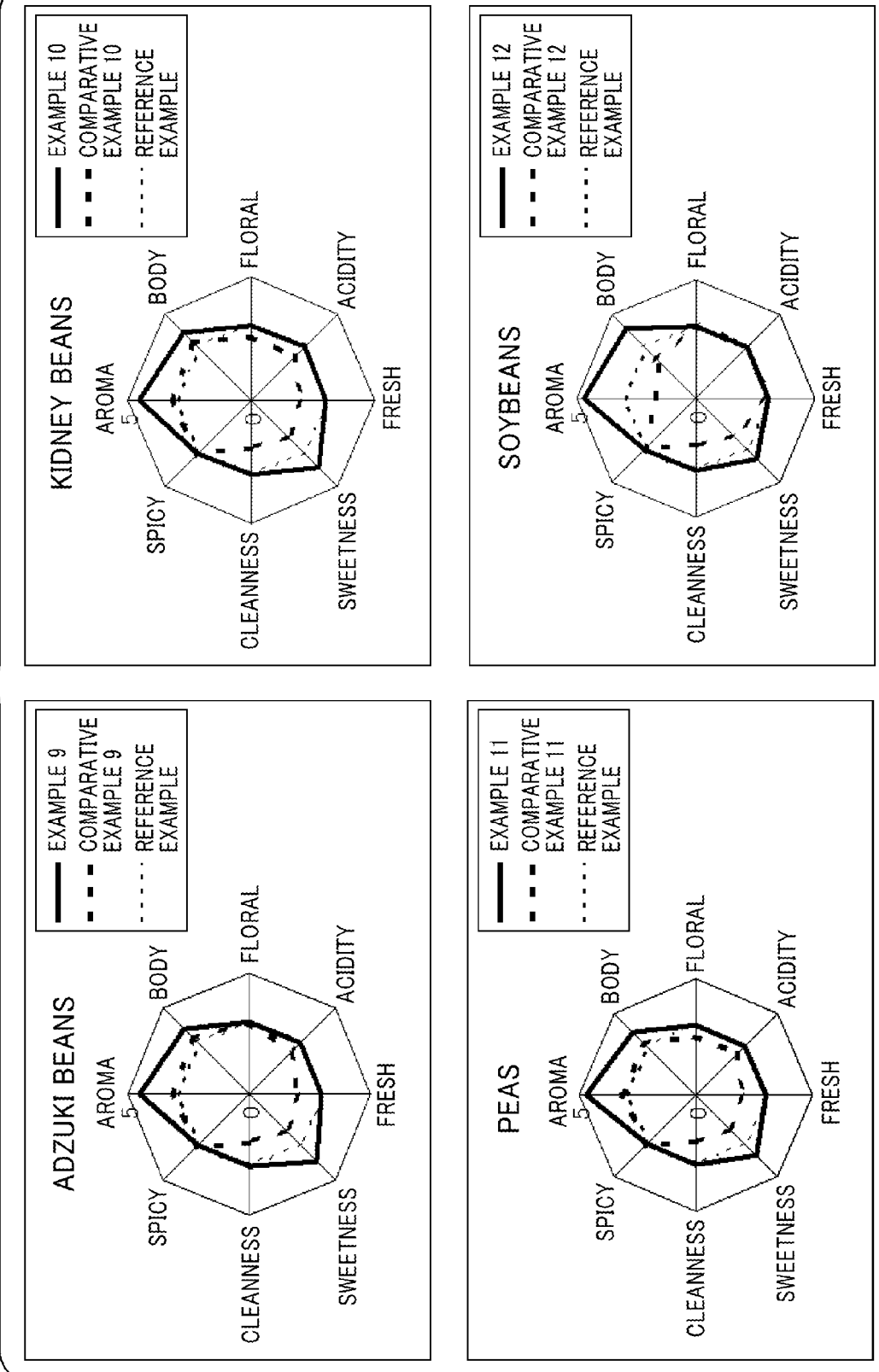
Figure 5B:
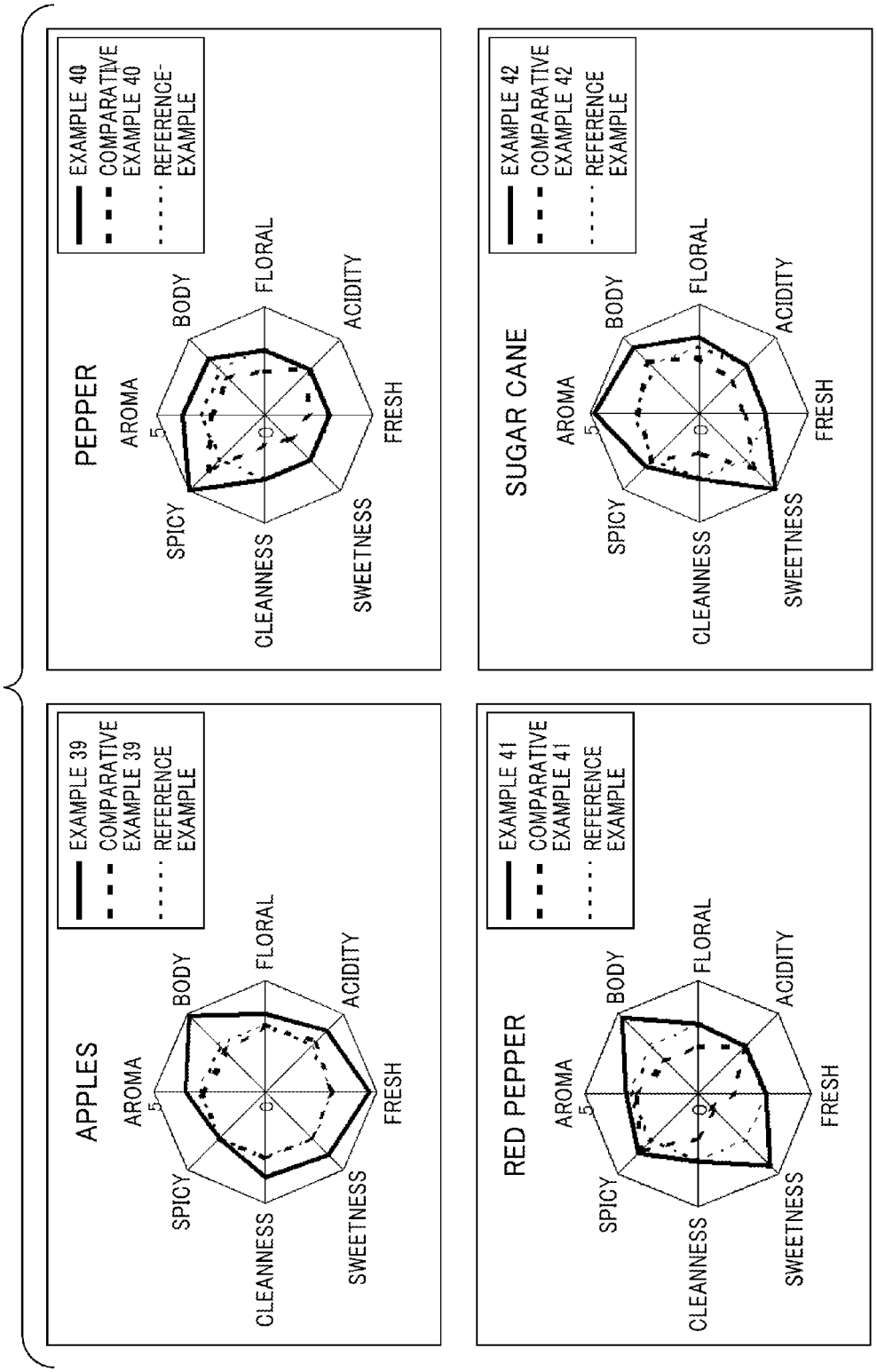
Figure 6A:
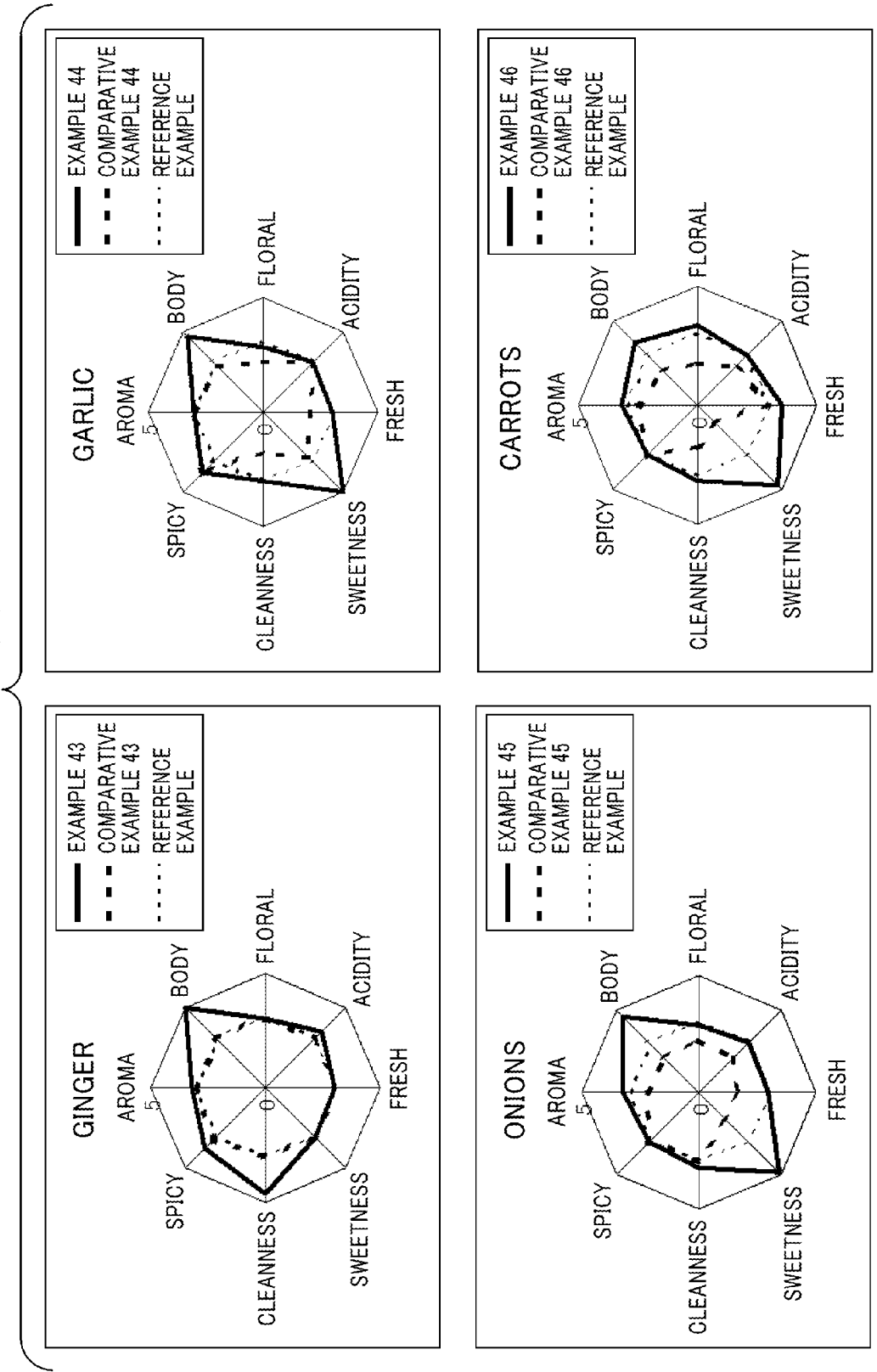
Figure 7A:
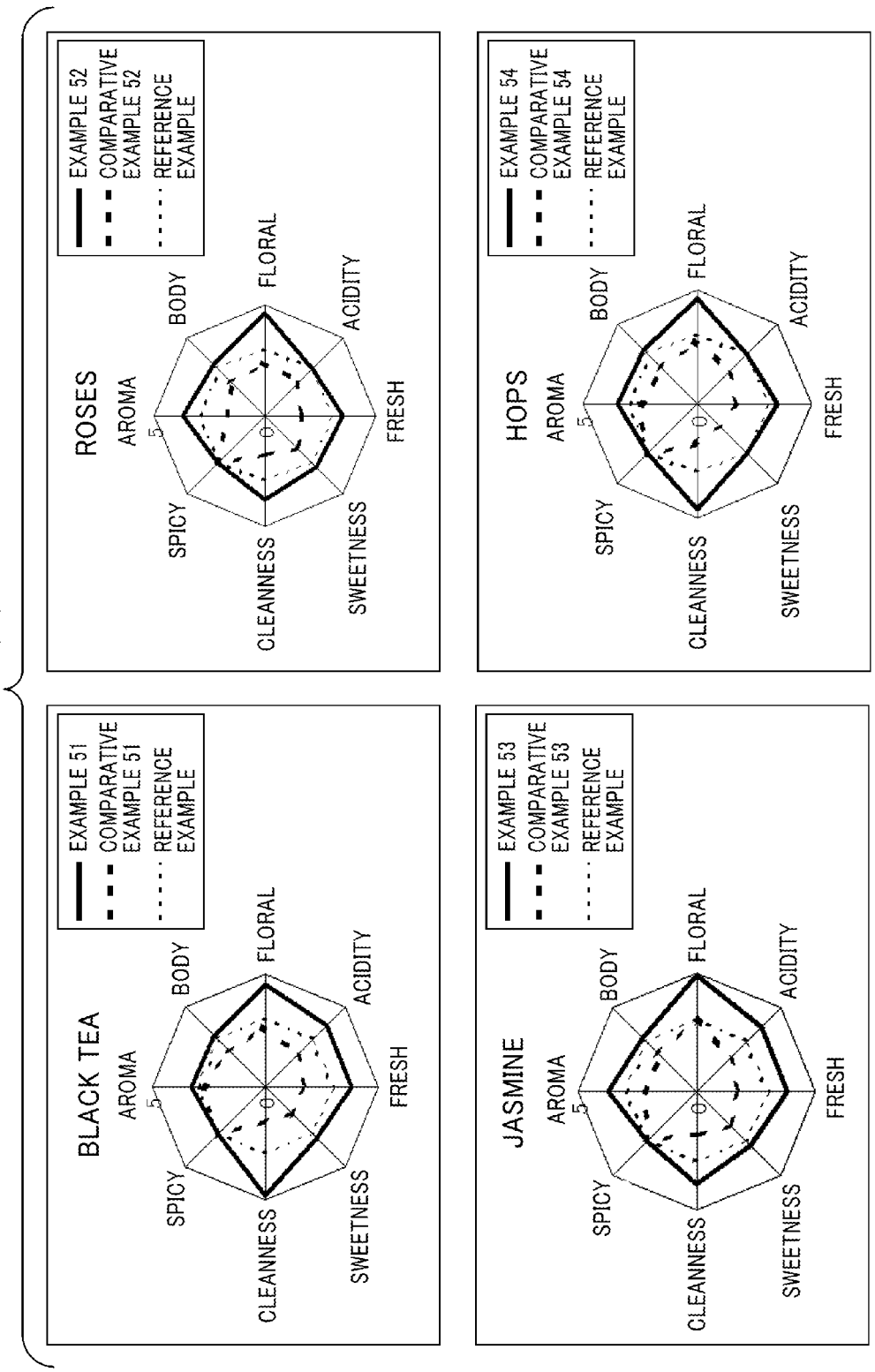
FIG. 7(a) and FIG. 7(b) show evaluations of the characteristics of extracts obtained from roasted mixtures of Examples 51 to 58, Reference Example, and Comparative Examples 51 to 58.
Figure 7B:
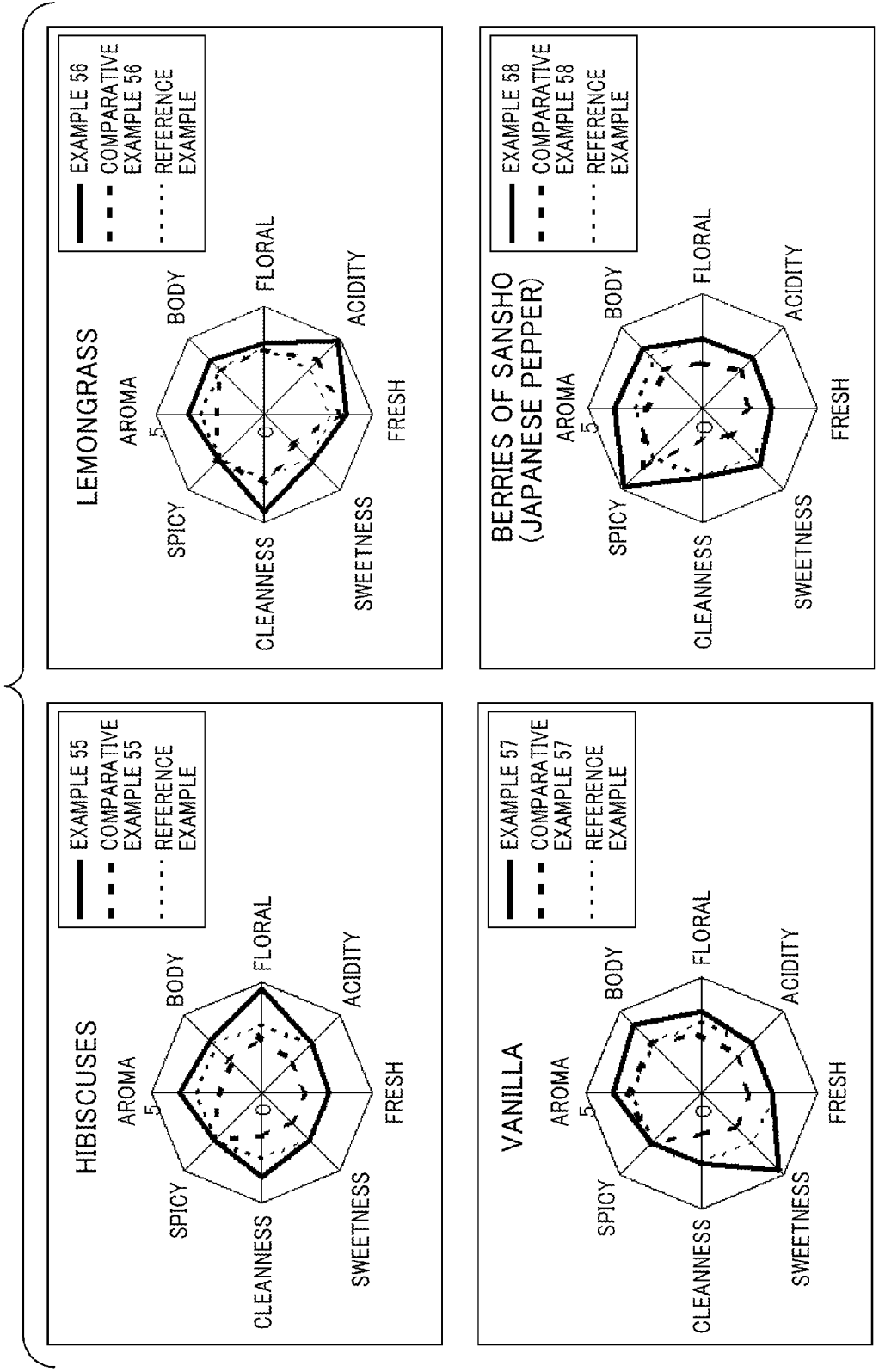
Figure 8A:
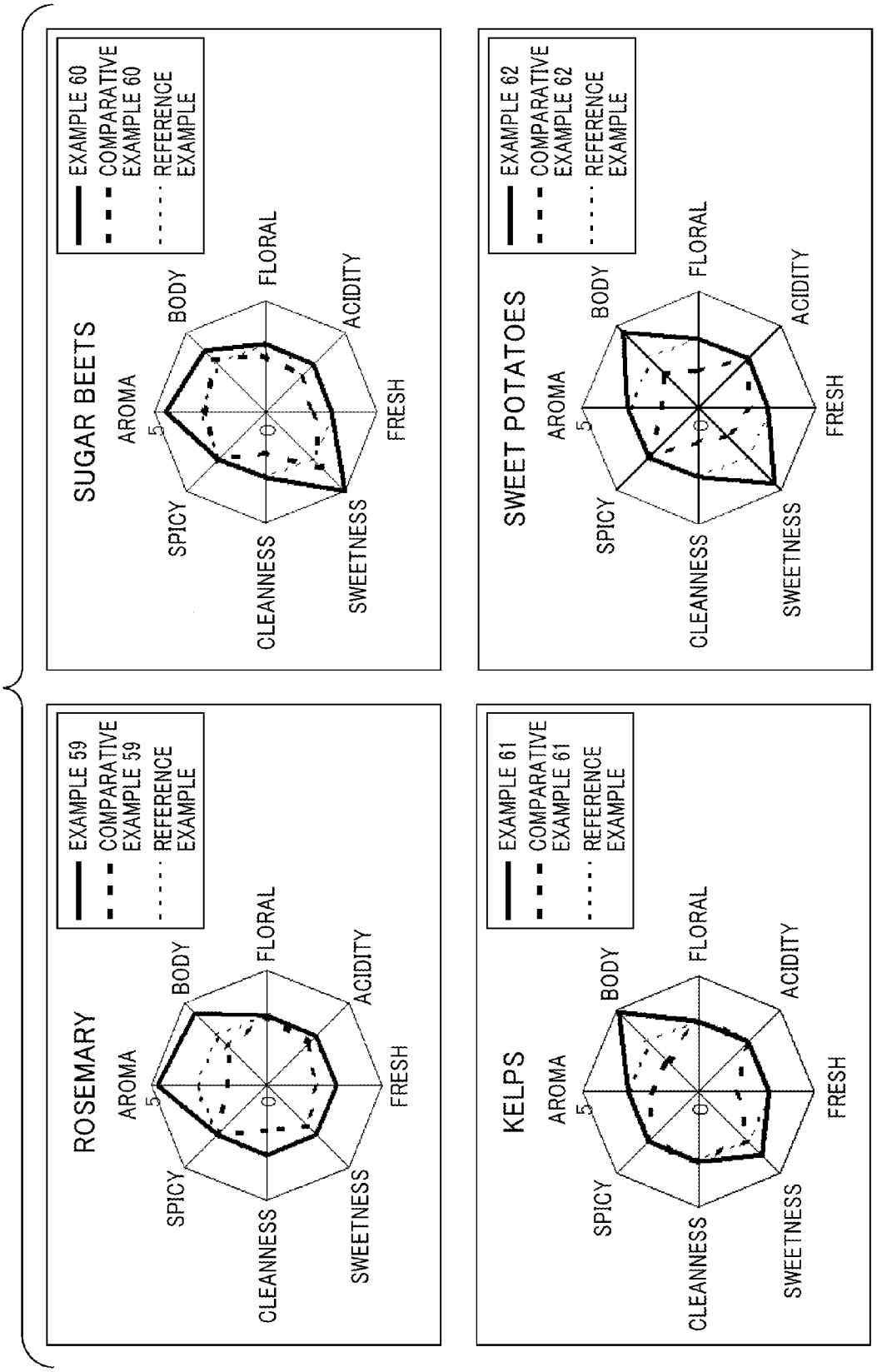
FIG. 8(a) and FIG. 8(b) show evaluations of the characteristics of extracts obtained from roasted mixtures of Examples 59 to 66, Reference Example, and Comparative Examples 59 to 66.
Figure 8B:
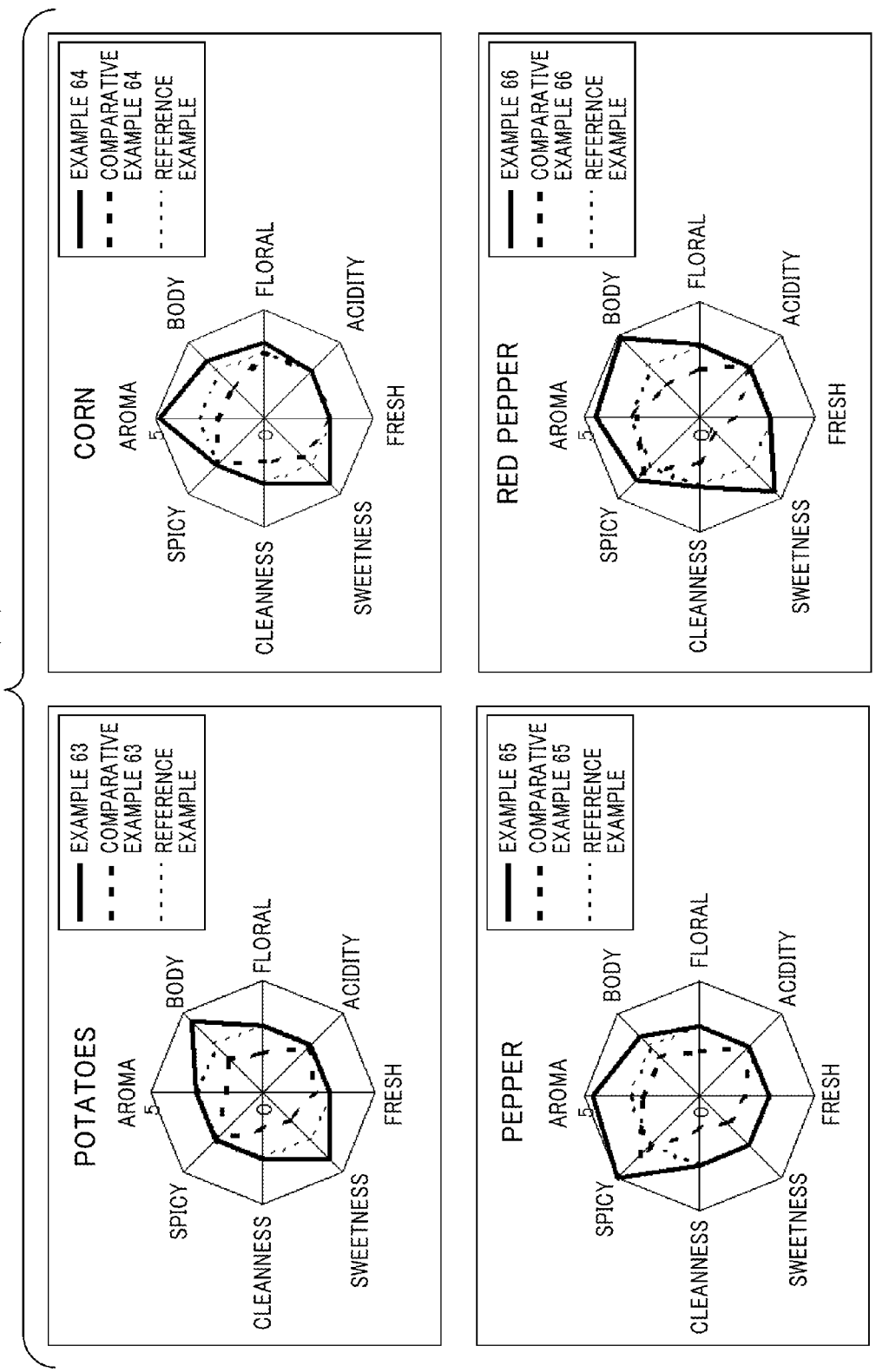
Figure 9:
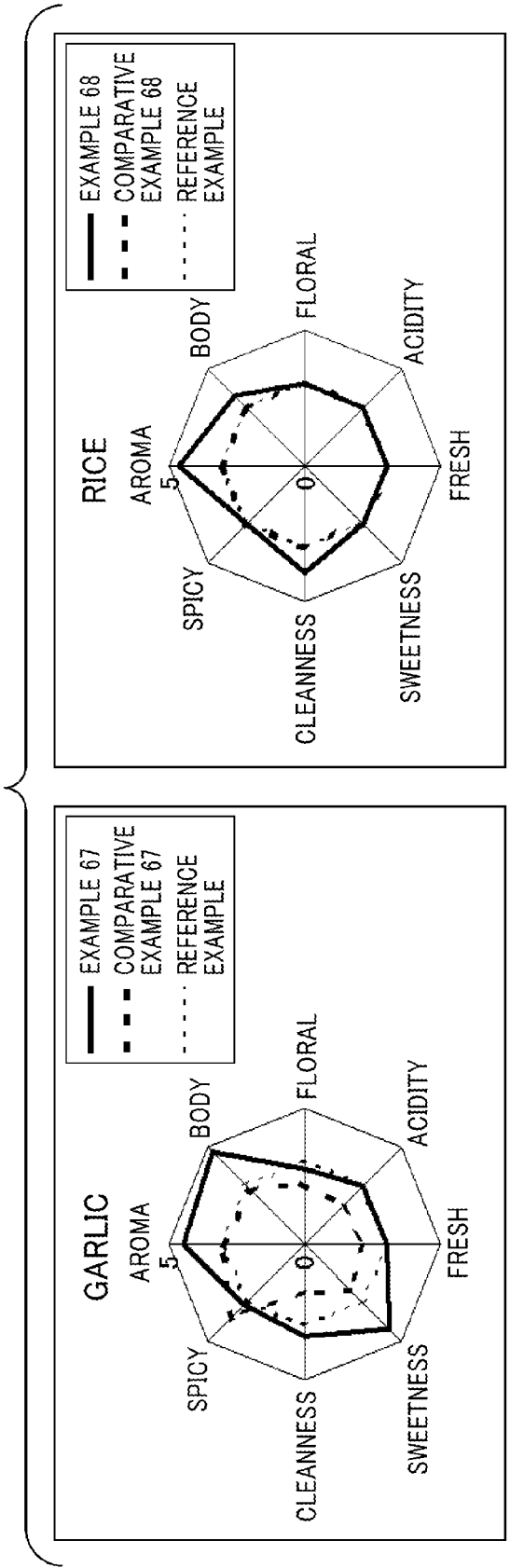
FIG. 9 shows evaluations of the characteristics of extracts obtained from roasted mixtures of Examples 67 and 68, Reference Example, and Comparative Examples 67 to 68.

Roasted mixtures of the present invention are made through a process of roasting a mixture of coffee beans and at least one material selected from a group consisting of oolong tea, pu'er tea, black tea, roses, jasmine, hops, hibiscuses, lemongrass, berries of sansho (Japanese pepper), rosemary, vanilla, sugar beets, kelps, adzuki beans, kidney beans, peas, soybeans, almonds, cashew nuts, seeds of Japanese horse chestnuts, pumpkin seeds, chestnuts, walnuts, sesame seeds, sunflower seeds, hazelnuts, pecan nuts, macadamia nuts, pine nuts, peanuts, rice, barley, malt, buckwheat seeds, Job's tears seeds, mandarin orange peels, orange peels, peels of kabosu (a type of Japanese citrus fruit), grapefruit peels, peels of sudachi (another type of Japanese citrus fruit), peels of yuzu (a species of aromatic Asiatic citron), lime peels, lemon peels, blueberries, prunes, cherries, persimmons, pineapples, bananas, grapes, mangos, peaches, apples, pepper, red pepper, sugar cane, ginger, garlic, onions, carrots, burdock, pumpkins, sweet potatoes, potatoes and corn.

In this respect, a material which helps to enhance some of the coffee characteristics needs to be selected because an arbitrary material cannot necessarily be used as a material to be blended and roasted with coffee beans. The above-listed materials are those which the below-described examples actually confirmed can be preferably mixed with coffee beans. Examples which are explained as comparative examples among the below-described examples are not desirable, because they do not enhance the coffee characteristics, otherwise because they cannot be roasted. For example, although cacaos are preferably mixed with coffee beans, the cacaos are not desirable because the cacaos do not enhance the coffee characteristics. In this respect, it is desirable that an amount of the material should be less than 5 mass percent. It is more desirable that the amount should be equal to or less than 4 mass percent. A higher amount is not desirable because it spoil the coffee flavor.

The above-mentioned material is mixed with the coffee beans while the coffee beans are being roasted. The mixing while the coffee beans are being roasted makes it possible to achieve uniform and efficient roasting because the heat transferred from the coffee beans in the midst of being roasted works on the material to a large extent.

The roasting of the coffee beans before the material is mixed with the coffee beans may be performed with a publicly-known method. No specific restriction is imposed on the roasting of the coffee beans before the material is mixed with the coffee beans. It is desirable, however, that the duration of roasting the coffee beans (the duration between the putting of the coffee beans into the roaster and the putting of the material into the roaster) should be not less than 5 minutes but not greater than 15 minutes, for example. In addition, it is desirable that the duration of roasting the mixture after the material is mixed with the coffee beans (the duration between the putting of the material into the roaster and the completing of the roasting of the mixture) should be not less than 0.5 minutes but not greater than 10 minutes. It is more desirable that the duration of roasting the mixture should be not less than 0.5 minutes but not greater than 6 minutes. Incidentally, specific roasting methods are threefold as follows.

(1) Roasting Method 1

The product temperature of the coffee beans is raised to 160° C. to 250° C. in approximately 5 minutes to approximately 15 minutes. Subsequently, the material to be mixed and roasted with the coffee beans is mixed therewith. Thereafter, the mixture is roasted for approximately 0.5 minutes to approximately 3 minutes with the quantity of heat controlled in order to keep the product temperature of the mixture at 180° C. to 250° C. without the temperature of the mixture rising or remaining at a higher temperature.

(2) Roasting Method 2

The product temperature of the coffee beans is raised to 160° C. to 250° C. in approximately 5 minutes to approximately 15 minutes. Subsequently, the material to be mixed and roasted with the coffee beans is mixed therewith. The mixture is roasted for approximately 1 minute to approximately 6 minutes with the quantity of heat controlled in order to keep the product temperature of the mixture at a constant temperature which is in a range of 180° C. to 250° C.

(3) Roasting Method 3

The product temperature of the coffee beans is raised to 160° C. to 240° C. in approximately 5 minutes to approximately 15 minutes. Subsequently, the material to be mixed and roasted with the coffee beans is mixed therewith. Thereafter, the mixture is roasted by heating in order to raise the product temperature of the mixture in approximately 2 minutes to approximately 3 minutes.

No specific restriction is imposed on the temperature for roasting the coffee beans or the mixture of the coffee beans and the material. However, the control for the product temperature of the roasted beans to be, for example, approximately 160° C. to 250° C. is advantageous to the purpose of keeping a rich coffee flavor. A product temperature of less than 160° C. is not desirable because the temperature makes it difficult to obtain a high-quality coffee flavor, while a product temperature of greater than 250° C. is not desirable because the beans are over-roasted. Heating systems suitable for the method of roasting the coffee beans or the mixture of the coffee beans and the material include a direct-fire type one, a hot-air type one, a half-hot-air type one, a charcoal type one, a far-infrared irradiation type one, a microwave type one and a superheated steam type one. Apparatus types suitable for the method include a horizontal (lateral) drum type, a vertical (longitudinal) drum type, a vertical rotating bowl type, a fluidized-bed type and a pressure type. Any heating system and any apparatus type may be selected arbitrarily in accordance with product designs such as taste. In addition, generally speaking, the roasted coffee beans or the roasted mixture starts to be cooled within 30 minutes after their roast from the viewpoint of flavor. It is desirable to start the cooling within 10 minutes; more desirable, within 5 minutes; and the most desirable, within one minute. It is desirable to cool the roasted mixture to a temperature of 0° C. to 100° C.; and more desirable, 10° C. to 60° C. The cooling may be achieved by either an air cooling method or a water cooling method. Examples of coolant available for the cooling include: water, a solvent extract from the coffee beans, its dilution and concentration, a solution of soluble coffee solid matter, and its dilution.

It is desirable that the Hunter L value, which represents a measurement of the degree of roast with a colorimeter with respect to the roasted mixture of the coffee beans and the material made in the present invention, should be 10 to 30. When the Hunter L value falls within this range, the aroma and sweetness becomes well-balanced in the coffee. From the viewpoint of flavor, it is desirable that the Hunter L value should be in a range of 10 to 25; more desirable, in a range of 15 to 25; and particularly desirable, in a range of 20 to 25. Otherwise, control may be made to obtain the Hunter L value in a range of 10 to 30 by blending two or more types of coffee beans which are different in the degree of roast from one another within a Hunter L value range of 10 to 60.

The roasted mixture is ground after cooled. No specific restriction is imposed on the method of grinding the roasted mixture. The grinding may be achieved by a normal dry method. Otherwise, the grinding may be achieved by a wet grinding method in which the roasted mixture are ground while the roasted mixture and a solvent are mixed together. An extract can be obtained by subjecting the obtained ground matter to extraction with hot water or the like. No specific restriction is imposed on a solvent to be used for the extraction. It is desirable that an aqueous solvent, especially a solvent with a low inflammability, should be used. Specific examples include: water such as service water, ion-exchanged water, deoxidized water and pure water; an aqueous solution obtained by adding glycerin, propylene glycol, sugar alcohol, higher alcohol or the like to water; an aqueous solution obtained by adding an emulsifier such as sucrose fatty acid ester to water; and an aqueous solution containing an acidity regulator such as sodium bicarbonate to water. A solvent extract can be obtained by subjecting a mixture of the roasted mixture and the solvent, which are mixed in a generally-used ratio, to the extraction at a predetermined temperature for a predetermined length of time; and thereafter separating the roasted mixture and the extract by use of a general method. Conditions for these differ to a large extent depending on a type of roasted mixture to be used, a grind size of roasted beans, a solvent to be used, extraction temperature, extraction time and the like. A solvent extract of the roasted mixture can be obtained, for example, by filtering a mixture of 0.1 to 20 parts by weight of a solvent at the temperature of 0° C. to 100° C. and one part by weight of the roasted mixture after the mixture is left for 5 minutes to 5 hours, by filtering the mixture of the coffee beans and the solvent after the mixture is stirred, by filtering the mixture of the roasted mixture and the solvent after compression extraction, or by doing a thing similar.

The obtained extract may be served as a straight coffee drink, or as a beverage containing milk, sugar and the like in accordance with the taste.

Descriptions will be provided for coffee beans which are used as a material.

Coffee beans are seeds of plants of the genus *Coffea* in the family Rubiaceae. The genus *Coffea* is roughly classified into *Coffea arabica* and the "robusta" form of *Coffea canephora*. More than 200 species are known as the genus *Coffea*. Although no specific restriction is imposed on which species should be selected, examples of species to be selected include: *Coffea arabica* from Brazil, Columbia and the like; and the "robusta" from Vietnam, Indonesia and the like. Coffee beans of a single species may be used. Alternatively, blended coffee beans of multiple species may be used.

Descriptions will be hereinbelow provided for specific materials which are blended with coffee beans and are roasted together.

Oolong Tea: Raw leaves of any plant of the species *Camellia sinensis* of the genus *Camellia* in the family Theaceae may be used as oolong tea to be used for the present invention. *Camellia sinensis* var. *sinensis*, for example, may be used as a variety suitable for the present invention. Various types of oolong tea available in the market may be used for the present invention. Any one of Hong Oolong, Pengfeng Cha, Cuishi Cha, Wuyi Shuixian, Wuyi Qi Zhong, Guangdong Fenghuang Shuixian, Tieguanyin, Huangjin Gui, Se Zhong, Oolong, Taiwanese Dong Ding, Duiwai cha and Hulu Dui cha may be used for the present invention.

Pu'er Tea: Raw leaves of any plant of the species *Camellia sinensis* of the genus *Camellia* in the family Theaceae may be used as pu'er tea to be used for the present invention. Their raw tea, mature tea and the like may be used. For example, pu'er tea fermented in a dry storage condition also may be used as preferred types of pu'er tea.

Black Tea: Black tea to be used as a material is tea manufactured through a fermentation process from leaves and stems which are obtained from plants of *Camellia sinensis* var. *sinensis*, plants of *Camellia sinensis* var. *assamica* or plants of their hybrids, which are evergreen trees of the species *Camellia sinensis* of the genus *Camellia* in the family Theaceae in the order Theales. Black tea from India, Sri Lanka, Indonesia, Kenya, China and any other countries are suitable. It does not matter whether the black tea is in a whole leaf grade, a broken leaf grade or any other leaf grade.

Roses: The rose is a name generally referring to species belonging to the genus *Rosa* of the family Rosaceae. No specific restriction, except for edibility, is imposed on roses to be used for the present invention. Examples of the edible roses include Rosa damascena, Autumn Damask, La France, Papa Meilland, Lady Hillingdon, Sweet Juliet, Duchess du Brabant, White Christmas, and Blue Moon.

Jasmines: The jasmine is a name generally referring to plants of the genus *Jasminum* in the family Oleaceae. More than 300 species are known as Jasmines. No specific restriction is imposed on the jasmines to be used for the present invention. Examples of the jasmine species include *Jasminum beesianum, Jasminum floridum* and *Jasminum grandiflorum*.

Hops: Hops to be used of the present invention are dried female cone flowers of rhizocarpous perennial plants of the species *Humulus lupulus* of the family Moraceae. No specific restriction is imposed on the hops to be used for the present invention. Examples of usable hop varieties include Saaz in Czech, Hallertau Magnum in Germany, Perle in Germany, Nugget in the U.S., and Furano #18 in Japan.

Hibiscuses: Hibiscuses to be used for the present inventions are plants of the genus *Hibiscus* of the family Malvaceae. No specific restriction, except for edibility, is imposed on the hibiscuses to be used for the present invention. For example, particularly, *Hibiscus sabdariffa* L., *Hibiscus cannabinus* L., *Hibiscus rosa-sinensis* L. and the like are preferably used for the present invention.

Lemongrass: The lemongrass (*Cymbopogon citratus*) is a species which is among more than 50 species belonging to the genus *Cymbopogon* of the family Poaceae. No specific restriction, except for edibility, is imposed on the lemongrass to be used for the present invention. In addition to the lemongrass (*Cymbopogon citratus*), the East-Indian lemongrass (*Cymbopogon flexuosus*) can be raised as an example to be used for the present invention.

Berries of Sansho (Japanese pepper): Berries of the sansho (*Zanthoxylum piperitum*) is the fruit of deciduous shrubs of the genus *Zanthoxylum* of the family Rutaceae. No specific restriction is imposed on the berries of the sansho to be used for the present invention. Examples of the berries of the sansho include berries of Asakura sansho (*Z. piperitum* (L.) DC forma inerme (Makino) Makino), berries of Budou sansho, and berries of Sichuan pepper (*Zanthoxylum bungeanum*).

Rosemary: The rosemary is an evergreen shrub belonging to the family Lamiaceae. Leaves of the rosemary are used for the present invention. No specific restriction is imposed on which species should be used for the present invention. For example, Tuscan Blue rosemary and Majorica Pink rosemary which are upright shrubs, as well as Fota Blue rosemary and Prostratus rosemary which are trailing shrubs, can be preferably used for the present invention. Although both raw leaves and dried leaves of rosemary can be used, the use of dried leaves is desirable.

Vanilla: The vanilla (whose scientific name is *Vanilla planifolia*) to be used for the present invention is a plant of the genus *Vanilla* of the family Orchidaceae. No specific restriction is imposed on the vanilla to be used for the present invention. Any variety, including those grown in Madagascar, those grown in Indonesia and those grown in China, may be used for the present invention. It is desirable that cured vanilla beans should be used from the viewpoint of flavor. Furthermore, it is desirable that beans in pods should be used.

Sugar beets: The sugar beet (*Beta vulgaris* var. *rapa*) is a plant belonging to the family Chenopodiaceae, and is called as Sato daikon (whose literal translation is sugar radish in Japanese) or as beets, and are plant. Because sugar beets are resistant to coldness, they are grown in mid-latitude to high-latitude regions as cold-climate farm products. No specific restriction is imposed on the varieties or growing fields of the sugar beets to be used for the present invention.

Kelps: Kelps are seaweeds belonging to the family Laminariaceae of the order Laminariales of the class Phaeophyceae of the phylum Heterokontophyta. No specific restriction is imposed on kelp species to be used for the present invention. Examples of the usable species include the genus *Saccharina* to which Saccharina japonica belongs, and the genus *Kjellmaniella gyrata* to which Kjellmaniella crassifolia belongs.

Adzuki beans: Adzuki beans are seeds of plants of the species *Vigna angularis* of the genus *Vigna* of the family Fabaceae. Adzuki beans of any variety may be used for an example, as long as they are edible. For example, Hokkai adzuki is among the usable varieties.

Common beans: The common bean (*Phaseolus vulgaris*) is a plant of the family Fabaceae. No specific restriction, except for edibility, is imposed on common beans to be used for the present invention. The common beans include green beans whose young pods are eaten, and shelled beans whose mature seeds are eaten. As varieties, Columbia, Cruiser, Marrowfat may be preferably used.

Peas: Peas are seeds of plants of the species *Pisum sativum* L. within the family Fabaceae. *Pisum sativum* L. is divided into *P. s.* ssp. *arvense* Poir. and *P. s.* ssp. *hortense* Asch., depending on its hardness of pods. Peas are mainly classified into blue peas, red peas, and field peas. No specific restriction is imposed on peas to be used for the present invention, as long as the peas are edible. Examples of the varieties of the species *Pisum sativum* L. include Usui peas, Kinusaya peas, Netherlands peas, and Snap peas.

Soybeans: soybeans are seeds of annual plants of the species *Glycine max* of the family Fabaceae. No specific restriction is imposed on soybeans to be used for the present invention, as long as the soybeans are edible. Examples of the varieties of the species *Glycine max* include Toyo musume, Toya homare, Miyagi shirome, Tachi nagaha, Ootsuru, Oosuzu and Suzu yutaka.

Almonds: Almonds are nuts of plants of the species *Prunus dulcis* of the genus *Prunus* of the family Rosaceae. The varieties of almonds include sweet almonds and bitter almonds. The sweet almonds are use as food. No specific restriction is imposed on almonds to be used for the present invention, as long as the almonds are edible. Examples of the varieties of the usable almonds include Nonpareil, California, Carmel, Mission and Bute.

Cashew nuts: Cashew nuts are seeds of plants of the species *Anacardium occidentale* within the family Anacardiaceae. Cashew nuts are produced in tropical and subtropical zones on the globe. No specific restriction is imposed on cashew nuts to be used for the present invention, as long as the cashew nuts are edible. Cashew nuts from India, Vietnam, Brazil and the like may be used.

Seeds of Japanese horse chestnuts: The seeds of Japanese horse chestnuts are seeds of plants of the species *Aesculus turbinata* of the genus *Aesculus* of the family Sapindaceae. No specific restriction is imposed on varieties whose seeds are used for the present invention. Any variety may be used as long as its seeds are edible. For the viewpoint of flavor, it is desirable that seeds from which the astringent taste is removed should be used.

Pumpkin seeds: The pumpkin is a name generally referring to plants of the genus *Cucurbita* of the family Cucurbitaceae. Pumpkin seeds are seeds of such plants. No specific restriction is imposed on pumpkins whose seeds are used for the present invention. *C. maxima, C. moschata, C. pepo* and the like are preferably used.

Chestnuts: Chestnut is a name generally referring to trees belonging to the genus *Castanea* of the family Fagaceae. Many species are present under the genus *Castanea*. No specific restriction is imposed on chestnuts to be used for the present invention, as long as their nuts are edible. Examples of the species of the usable chestnuts include *Castanea crenata* (Japanese chestnut), *Castanea alnifolia* (Bush Chinkapin), *Castanea henryi* (Henry's Chestnut), and *Castanea mollissima* (Chinese chestnut).

Walnuts: Walnuts are processed nuts made from nutmeats of the stone fruit of trees of the genus *Juglans* of the family Juglandaceae. Many species are present within the genus *Juglans*. No specific restriction is imposed on walnuts to be used for the present invention, as long as the walnuts are edible. Examples of the species whose walnuts are usable include *Juglans mandshurica* var. *sachalinensis, Juglans mandshurica* var. *cordiformis, Juglans regia, Juglans regia* var. *orientis*.

Sesame seeds: Sesame seeds are seeds of plants of the species *Sesamum indicum* of the genus *Sesamum* of the family Pedaliaceae. There are many sesame seed varieties. No specific restriction is imposed on sesame seed varieties to be used. Examples of the preferably usable varieties include white sesame seeds, black sesame seeds, tan and black sesame seeds, and golden sesame seeds.

Sunflower seeds: Sunflowers are plants of the species *Helianthus annuus* within the family Asteraceae. The species *Helianthus annuus* includes varieties used for oil, varieties used for food, and varieties used as ornamental plants. Seeds of plants of the varieties used for food are used for the present invention. No specific restriction is imposed on what varieties are used for the present invention. Sunflowers produced in Europe, China and South America may be used.

Hazelnuts: Hazelnuts are nuts of *Corylus avellana* classified under the genus *Corylus* of the family Betulaceae. No specific restriction is imposed on hazelnuts to be used for the present invention, as long as the hazelnuts are edible. The shape of hazelnuts ranges from rounded, pointed and long. Examples of the usable hazelnuts include Aci, Cakildak, Incekara, Kus, Yassi Badem and Yuvariak Badem.

Pecan nuts: Pecan nuts are seeds of pecans which are deciduous trees of the species *Carya illinoinensis*) within the family Juglandaceae. Plants of the genus *Carya* of the family Juglandaceae grow mainly in North America and Central America. Nuts of the plants are used. No specific restriction is imposed on pecan nuts to be used for the present invention, as long as the pecan nuts are edible. Examples of the usable pecan nuts include pecan nuts from the U.S.

Macadamia nuts: Macadamia (Macadamia integrifolia) is evergreen plants within the family Proteaceae. Nuts of the evergreen plants, which are 2 cm in the diameter, are called macadamia nuts. Any macadamia nuts may be used as long as they are edible. Examples of the usable macadamia nuts include macadamia nuts from Australia, Hawaii and South Africa. It does not matter which region the macadamia nuts are from.

Pine nuts: Pine nuts to be used for the present invention are the endosperm of seeds of plants of the genus *Pinus* of the family Pinaceae. Any species under the genus *Pinus* may be used as long as its pine nuts are edible. For example, seeds of *Pinus pinea, Pinus koraiensis, Pinus edulis* and *Pinus cembroides* may be used.

Peanuts: Peanuts are seeds of plants of the species *Arachis hypogaea* of the genus *Arachis* of the family Fabaceae. Any peanuts may be used as long as they are edible. It is desirable that groundnuts shelled should be used for the present invention. Examples of the varieties usable for the present invention include Chiba Handachi, Nakate Yutaka, Tachi Rakkasei #1, Kintoki, Fukumasari.

Rice: Rice is the seeds of plants of the genus *Oryza* within the family Poaceae. Rough classification of the species *Oryza sativa* into subspecies *Oryza sativa* subsp. *japonica* and *Oryza sativa* subsp. *indica* is widely known. Many varieties are present under each subspecies. No specific restriction is imposed on rice to be used for the present invention, as long as the rice is edible. For example, any of the varieties including *Koshi Hikari, Hitomebore* and *Akita Komachi*, as well as kao hom mari from Thailand may be used. Furthermore, any variety of rice may be used as any of brown rice (unmilled or partly milled rice) and fully-milled rice.

Barley: Barley is cereal grains of plants of the species *Hordeum vulgare* of the *Hordeum* of the family Poaceae. Barley serves mainly as barley tea, milled barley products, and a source of material (malt) for brewed beverages. Any of them may be used. It is desirable that barley for barely tea should be used.

Malt: Malt is germinated cereal grains made from the seeds of barley, which is dried after the germination. As in the case of the barley, any variety may be used for the malt. When the malt is dried and roasted, it is desirable that the malt should be roasted at a lower degree.

Buckwheat seeds: Buckwheat seeds are cereal grains of plants of the species *Fagopyrum esculentum* of the genus *Fagopyrum* of the family Polygonaceae. Many varieties are present within the species *Fagopyrum esculentum*. Any such variety may be used as long as its seeds are edible. Examples of the usable varieties include Kitawase buckwheat, Kitayuki, Shinano #1 and Kaidawase.

Job's tears seeds: Job's tears seeds are cereal grains of plants of *Coix lacryma-jobi* var. *ma-yuen* which is a variety of the species *Coix lacryma-jobi* of the genus *Coix* of the family Poaceae. Any type of *Coix lacryma-jobi* var. *ma-yuen* may be used as long as its grains are edible. Examples of the usable types include Okayama Zairai, Hato Chikara and Okhotsk #1.

Mandarin orange peels: Mandarin orange peels are the peels of the fruit of plants of the citrus varieties within the genus *Citrus*. Any variety within the species *Citrus may* be used as long as the peels of its fruits are edible. Examples of the usable varieties include Mandarin oranges, Unshu mikan, Ponkan and Kishu mikan.

Orange peels: Orange peels are the peels of the fruit of plants of the orange varieties of the species *Citrus sinensis* of the genus *Citrus* of the family Rutaceae. Any such variety may be used as long as the peels of its fruits are edible. Examples of the usable varieties include Valencia orange, Navel orange, and Bergamot orange.

Peels of kabosu: Kabosu peels are the peels of the fruit of plants of some sour citrus varieties of the species *Citrus sphaerocarpa* of the genus *Citrus* of the family Rutaceae. Examples of the usable kabosu include kabosu from Oita Prefecture, Ehime Prefecture, Miyazaki Prefecture and the like. No specific restriction is imposed on which prefecture the kabosu should be from. It does not matter which kabosu should be used, as long as the peels of the kabosu are edible.

Grapefruit peels: Grapefruit peels are the peels of the fruit of plants of the grapefruit varieties of the species *Citrus× paradisi* of the genus *Citrus* of the Rutaceae. Many varieties are present under the species *Citrus×paradisi*. These varieties are called "ruby," "white" and the like depending on the color of the flesh. Any such variety may be used.

Peels of sudachi: Sudachi peels are the peels of the fruit of plants of other sour citrus varieties of the species *Citrus sudachi* of the genus *Citrus* of the family Rutaceae. Sudachi is a species close to yuzu. Any such variety may be used as long as the peels of its fruits are edible.

Peels of yuzu: Yuzu peels are the peels of fruits of plants of other sour citrus varieties of the species *Citrus junos* of the genus *Citrus* of the family Rutaceae. Any such variety may be used as long as the peels of its fruits are edible. Examples of the usable varieties include Hon yuzu and Hana yuzu.

Lime peels: Lime peels are the peels of fruits of plants of other sour citrus varieties of the species *Citrus aurantifolia* of the genus *Citrus* of the family Rutaceae. Any such variety may be used as long as the peels of its fruit are edible. Examples of the usable varieties include Tahitian lime and Mexican lime.

Lemon peels: Lemon peels are the peels of the fruit of plants of other sour citrus varieties of the species *Citrus limos* of the genus *Citrus* of the family Rutaceae. Many varieties are present under the species *Citrus limos*. Any such variety may be used as long as the peels of its fruit are edible. Examples of the usable varieties include Lisbon, Eureka and Genova.

Blueberries: The blueberry is a name generally referring to plants classified as the section *Cyanococcus* of the genus *Vaccinium* of the family Ericaceae. Many species are present under the section Cyanococcus. Any such species may be used as long as its fruit is edible. Examples of the usable species include lowbush blueberry, northern blueberry, New Jersey blueberry and northern highbush blueberry.

Prunes: Prunes are the fruit of plants of the species *Prunus domestica* of the genus *Prunus* of the family Rosaceae. The Japanese name of the plans of the species *Prunus domestica* is seiyo sumomo. Many varieties are present under the species *Prunus domestica*. Any such variety may be used as long as its fruits are edible.

Cherries: Cherries are the fruit of plants of the genus *Prunus* of the family Rosaceae, and are called outou in Japanese as well. Many species are present under the genus *Prunus*. Any such species may be used as long as its fruit is edible. Examples of the usable species include *Prunus avium, Prunus cerasus, Ja volley* and *sato nishiki*.

Persimmons: Persimmons are the fruit of plants of the species *Diospyros Kaki* of the genus *Diospyros* of the family Ebenaceae. It is said that the number of the varieties of the species *Diospyros Kaki* exceeds 1,000. The varieties are divided into two broad groups: sweet persimmons and astringent persimmons. Any such variety may be used as long as its fruit is edible. Examples of the usable varieties include *Diospyros kaki* 'Fuyu,' *Diospyros kaki* 'Jiro,' *Diospyros kaki* 'Hira Tanenashi' and *Diospyros kaki* 'Tone Wase.' It is desirable that astringent persimmons from which the astringent taste is removed should be used.

Pineapples: Pineapple is a name generally referring to plants of the species *Ananas comosus* of the genus *Ananas* of the family Bromeliaceae whose origin is tropical zones of the American continent. Now, pineapples are produced in Thailand, the Philippines, Brazil, India, the United State, Vietnam, Okinawa in Japan, and the like. No specific restriction is imposed on which country the pineapples to be used for the present invention should be from. Any of Thai, Filipino, Brazilian, Indian, U.S., Vietnamese and Okinawan and the like pineapples may be used as long as its fruit is edible.

Bananas: Banana is a name generally referring to plants, whose fruits are edible, and which are within cultivars belonging to a group of *Musa* species under the genus *Musa* of the family Musaceae. Any such cultivar may be used. Examples of the usable cultivars include Cavendish and Gros Michel.

Grapes: Grapes are fruits of grapevines of *Vitis* species of the family Vitaceae. There are many species. Any species may be used as long as its fruits are edible. Examples of the usable species include *Vitis vinifera, Vitis labrusca, Vitis rotundifolia, Vitis amurensis* and hybrids crossed between *Vitis vinifera* and one or more of *Vitis labrusca* and the like.

Mangos: Mangos are fruits of plants of the species *Mangifera indica* of the genus *Mangifera* of the family Anacardiaceae. Nowadays, 500 or more varieties of the species *Mangifera indica* are grown, and are produced in India, Mexico, the Philippines, Thailand and the like. Any variety may be used as long as its fruits are edible. Examples of the usable varieties include Irwin, Carabao, Nam Doc Mai, Nam-Klarng Wun and Alphonso.

Peaches: Peaches are fruits of plants of the species *Amygdalus persica* of the genus *Amygdalus* of the family Rosaceae. Many varieties are present under the species *Amygdalus persica*. Any variety may be used as long as its fruits are edible. Examples of the usable varieties include *Hakutou, Hakuhou* and *Suimitu*.

Apples: Apples are fruits of plants of the species *Malus pumila* of the genus *Malus* of the family Rosaceae. Many varieties are present under the species *Malus pumila*. Any variety may be used as long as its fruits are edible. Examples of the usable varieties include Fuji, Delicious, Golden Delicious, Ourin and Kougyoku.

Pepper: Pepper is a spice made from peppercorns of plants of the genus *Piper* of the family Piperaceae. Many species are present under the genus *Piper*. Any species may be used as long as its peppercorns are edible. Examples of the useable species include *Piper nigrum*, Indian long pepper and Cubeb.

Red pepper: Red pepper is fruits of plants of the species *Capsicum annum* of the genus *Capsicum* of the family Solanaceae. Many species are present under the genus *Capsicum*. Any species may be used as long as its fruits are edible. Examples of the usable species include *Capsicum annum, Capsicum baccatum* and *Capsicum chinense*.

Sugar cane: Sugar cane (*Saccharum officinarum*) is plants of the genus *Saccharum* of the family Poaceae. Sugar cane is grown in Brazil, India, China, Okinawa and the like. The present invention imposes no specific restriction on which country the sugar cane is from, as long as the sugar cane is edible. Examples of its usable varieties include F161, Miyako #1 and Nourin #26.

Ginger: Ginger is rhizomes of plants of the species *Zingiber officinale* of the genus *Zingiber* of the family Zingiberaceae. Many varieties are present under the species *Zingiber officinale*. Any variety may be used as long as its rhizomes are edible. Examples of the usable varieties include Otafuku as large ginger rhizomes, Sanshuu shouga as medium-sized ginger rhizomes, and Kintoki shouga as small ginger rhizomes.

Garlic: Garlic is bulbs of plants of the species *Allium sativum* L. to the genus *Allium* of the family Alliaceae of the order Asparagales. Many varieties are present under the species *Allium sativum*. Any variety may be used as long as its bulbs are edible. The varieties are roughly divided into three groups: Seiyou ninniku, Oo ninniku and Hime ninniku. Examples of the usable cutivars include I'shu wase, Enshu Goku Wase, Shanghai Wase, Katei White and White Rokuhen.

Onions: The onion is a sheath of the species *Allium cepa* the genus *Allium* of the family Alliaceae. Many varieties are present under the species *Allium cepa*. Any variety may be used as long as its sheath is edible. Examples of the usable varieties include Goku Wase, Wase, Nakate and Chu Bansei.

Carrots: The carrot (*Daucus carota* L.) is a vegetable of the genus *Daucus* of the family Apiaceae. Carrots are divided into two broad groups: eastern carrots and western carrots. Many varieties are present under the species *Daucus carota*. No specific restriction is imposed on the varieties, as long as their carrots are edible. Examples of the usable varieties include Kintoki carrots, Go-sun carrots, Nantes carrots.

Burdock: Burdock (*Arctium lappa*) is a plant of the genus *Arctium* of the family Asteraceae in the order Campanulales. Its root is used in the present invention. Many varieties are present under the species. Any variety may be used as long as its root is edible. Examples of the usable species include Takino kawa and Hori kawa.

Pumpkins: The pumpkin is a fruit of the genus *Cucurbita* of the family Cucurbitaceae. Pumpkins are divided into three broad species: *Cucurbita maxima, Cucurbita moschata* and *Cucurbita Pepo*. Any variety under the species may be used as long as its fruit is edible. Examples of the usable varieties include Ebisu pumpkins, Aokawa pumpkins, Kurokawa pumpkins and Yukigeshou pumpkins.

Sweet potatoes: The sweet potato (*Ipomoea batatas* L.) is a root tuber of the genus *Ipomoea* of the family Convolvulaceae. Any variety under the species *Ipomoea batatas* may be used as long as its root tuber is edible. Examples of the usable varieties include Beni Azuma, Beni Komachi, Beni Aka and Kintoki.

Potatoes: The potato (*Solanum tuberosum* L.) is an underground stem of the genus *Solanum* of the family Solanaceae. Many varieties are present under the species *Solanum tuberosum*. No specific restriction is imposed on which varieties should be used. Examples of the usable varieties include Danshaku imo, May Queen, Kita Akari and Russet Burbank.

Corn: Corn (*Zea mays*) is fruit of the genus *Zea* of the family Poaceae. Many varieties are present under the species *Zea mays*. No specific restriction is imposed on which varieties should be used, as long as its corn is edible. It is desirable that edible corn, such as sweet corn, sweet yellow corn, sweet bicolor corn and sweet white corn, should be used.

Moreover, it is desirable that the materials should be uniformly mixed with the coffee beans in the roaster, and some of the materials should be subjected to preliminary processes such as a cutting process and a drying process for the purpose of improving the flavor and properties. Any of cutting machines using a cutter, which are dedicated for food, may be used for the cutting process. A dicer for a dicing process, a slicer for a slicing process, and an ultrasonic cutter are among such cutting machines. In addition, a shelf dryer, a conveyor-type dryer, a rotary drum dryer, a rotary V-type dryer and the like may be used for the drying process. Furthermore, a roaster may be used. As a heat source, hot air, far-infrared radiation, infrared radiation, microwaves, superheated steam and the like may be suggested. Moreover, a wetting process is effective for some material (for example, rice). In this respect, the wetting process means a process in which rice is soaked in water, and steamed, and dried by a conventional method. No specific restriction is set on the water content of each of these materials. Nevertheless, it is desirable that the water content should be 20 mass percent or less from the viewpoint of flavor and handling easiness.

Descriptions will be hereinbelow provided using specific examples.

EXAMPLES

Example 1

Grapefruit peels were cut into pieces, 7 mm on each side, with an ultrasonic cutter. The cut pieces of the peels were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 120 grams of dry-processed pieces of the grapefruit peels were put into the roaster, and were mixed with the coffee beans during roasting. The mixture was roasted for an additional three minutes while controlling the amount of heat in order to keep the product temperature at 210° C. The roasted mixture thus obtained was discharged onto a cooling plate, and was cooled.

Example 2

Mandarin orange peels were cut into pieces, 7 mm on each side, with an ultrasonic cutter. The cut pieces of the peels were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 60 grams of dry-processed pieces of the mandarin orange peels were put into the roaster, and were mixed with the coffee beans during roasting. The mixture was roasted for an additional two minutes while controlling the amount of heat in order to keep the product temperature at 210° C. The roasted mixture thus obtained was discharged onto a cooling plate, and was cooled.

Example 3

Orange peels were cut into pieces, 7 mm on each side, with an ultrasonic cutter. The cut pieces of the peels were subjected to a drying process in a shelf dryer. At this time, the water content of the peels was 12%. Subsequently, three kilograms of green coffee beans were roasted with a coffee roaster. Approximately 11 minutes later, when the product temperature of the coffee beans reached 220° C., 60 grams of dry-processed pieces of the orange peels were put into the roaster, and were mixed with the coffee beans during roasting. The mixture was roasted for an additional three minutes while controlling the amount of heat in order to keep the product temperature at 210° C. The roasted mixture thus obtained was discharged onto a cooling plate, and was cooled.

Example 4

The peels of kabosu were cut into pieces, 7 mm on each side, with an ultrasonic cutter. The cut pieces of the peels were subjected to a drying process in a shelf dryer. At this time, the water content of the peels was 14%. Subsequently, three kilograms of green coffee beans were roasted with a coffee roaster. Approximately 11 minutes later, when the product temperature of the coffee beans reached 220° C., 60 grams of dry-processed pieces of the kabosu peels were put into the roaster, and were mixed with the coffee beans during roasting. The mixture was roasted for an additional 1.5 minutes while controlling the amount of heat in order to keep the product temperature at 210° C. The roasted mixture was discharged onto a cooling plate, and was cooled.

Example 5

The peels of sudachi were cut into pieces, 7 mm on each side, with an ultrasonic cutter. The cut pieces of the peels were subjected to a drying process in a shelf dryer. At this time, the water content of the peels was 15%. Subsequently, three kilograms of green coffee beans were roasted with a coffee roaster. Approximately 11 minutes later, when the product temperature of the coffee beans reached 220° C., 60 grams of dry-processed pieces of the sudachi peels were put into the roaster, and were mixed with the coffee beans during roasting. The mixture was roasted for an additional two minutes while controlling the amount of heat in order to keep the product temperature at 210° C. The roasted mixture was discharged onto a cooling plate, and was cooled.

Example 6

The peels of yuzu were cut into pieces, 7 mm on each side, with an ultrasonic cutter. The cut pieces of the peels were subjected to a drying process in a shelf dryer. At this time, the water content of the peels was 14%. Subsequently, three kilograms of green coffee beans were roasted with a coffee roaster. Approximately 11 minutes later, when the product temperature of the coffee beans reached 220° C., 120 grams of dry-processed pieces of the yuzu peels were put into the roaster, and were mixed with the coffee beans during roasting. The mixture was roasted for an additional three minutes while controlling the amount of heat in order to keep the product temperature at 210° C. The roasted mixture was discharged onto a cooling plate, and was cooled.

Example 7

Lime peels were cut into pieces, 7 mm on each side, with an ultrasonic cutter. The cut pieces of the peels were subjected to a drying process in a shelf dryer. At this time, the water content of the peels was 12%. Subsequently, three kilograms of green coffee beans were roasted with a coffee roaster. Approximately 11 minutes later, when the product temperature of the coffee beans reached 220° C., 120 grams of dry-processed pieces of the lime peels were put into the roaster, and were mixed with the coffee beans during roasting. The mixture was roasted for an additional three minutes while controlling the amount of heat in order to keep the product temperature at 190° C. The roasted mixture was discharged onto a cooling plate, and was cooled.

Example 8

Lemon peels were cut into pieces, 7 mm on each side, with an ultrasonic cutter. The cut pieces of the peels were subjected to a drying process in a shelf dryer. At this time, the water content of the peels was 14%. Subsequently, three kilograms of green coffee beans were roasted with a coffee roaster. Approximately 11 minutes later, when the product temperature of the coffee beans reached 220° C., 120 grams of dry-processed pieces of the lemon peels were put into the roaster, and were mixed with the coffee beans during roasting.

The mixture was roasted for an additional three minutes while controlling the amount of heat in order to keep the product temperature at 190° C. The roasted mixture was discharged onto a cooling plate, and was cooled.

Example 9

Commercially-available dried adzuki beans were used. At this time, the water content was 9%. Subsequently, three kilograms of green coffee beans were roasted with a coffee roaster. Approximately 11 minutes later, when the product temperature of the coffee beans reached 220° C., 120 grams of adzuki beans were put into the roaster, and were mixed with the coffee beans during roasting. The mixture was roasted for an additional three minutes while controlling the amount of heat in order to keep the product temperature at 200° C. The roasted mixture was discharged onto a cooling plate, and was cooled.

Example 10

Commercially-available dried kidney beans were used. At this time, the water content was 7%. Subsequently, three kilograms of green coffee beans were roasted with a coffee roaster. Approximately 11 minutes later, when the product temperature of the coffee beans reached 220° C., 120 grams of kidney beans were put into the roaster, and were mixed with the coffee beans during roasting. The mixture was roasted for an additional two minutes while controlling the amount of heat in order to keep the product temperature at 200° C. The roasted mixture was discharged onto a cooling plate, and was cooled.

Example 11

Commercially-available dried peas were used. At this time, the water content was 9%. Subsequently, three kilograms of green coffee beans were roasted with a coffee roaster. Approximately 11 minutes later, when the product temperature of the coffee beans reached 220° C., 120 grams of peas were put into the roaster, and were mixed with the coffee beans during roasting. The mixture was roasted for an additional two minutes while controlling the amount of heat in order to keep the product temperature at 180° C. The roasted mixture was discharged onto a cooling plate, and was cooled.

Example 12

Commercially-available dried soybeans were used. At this time, the water content was 9%. Subsequently, three kilograms of green coffee beans were roasted with a coffee roaster. Approximately 11 minutes later, when the product temperature of the coffee beans reached 220° C., 120 grams of soybeans were put into the roaster, and were mixed with the coffee beans during roasting. The mixture was roasted for an additional two minutes while controlling the amount of heat in order to keep the product temperature at 180° C. The roasted mixture was discharged onto a cooling plate, and was cooled.

Example 13

Commercially-available dried almonds were used. At this time, the water content was 11%. Subsequently, three kilograms of green coffee beans were roasted with a coffee roaster. Approximately 11 minutes later, when the product temperature of the coffee beans reached 220° C., 120 grams of almonds were put into the roaster, and were mixed with the coffee beans during roasting. The mixture was roasted for an additional two minutes while controlling the amount of heat in order to keep the product temperature at 215° C. The roasted mixture was discharged onto a cooling plate, and was cooled.

Example 14

Commercially-available dried cashew nuts were used. At this time, the water content was 8%. Subsequently, three kilograms of green coffee beans were roasted with a coffee roaster. Approximately 11 minutes later, when the product temperature of the coffee beans reached 220° C., 120 grams of cashew nuts were put into the roaster, and were mixed with the coffee beans during roasting. The mixture was roasted for an additional two minutes while controlling the amount of heat in order to keep the product temperature at 210° C. The roasted mixture was discharged onto a cooling plate, and was cooled.

Example 15

Commercially-available dried seeds of Japanese horse chestnuts, from which an astringent taste had been removed, were used. At this time, the water content was 13%. Subsequently, three kilograms of green coffee beans were roasted with a coffee roaster. Approximately 11 minutes later, when the product temperature of the coffee beans reached 220° C., 120 grams of seeds of the Japanese horse chestnuts were put into the roaster, and were mixed with the coffee beans during roasting. The mixture was roasted for an additional two minutes while controlling the amount of heat in order to keep the product temperature at 200° C. The roasted mixture was discharged onto a cooling plate, and was cooled.

Example 16

Commercially-available dried pumpkin seeds were used. At this time, the water content was 6%. Subsequently, three kilograms of green coffee beans were roasted with a coffee roaster. Approximately 11 minutes later, when the product temperature of the coffee beans reached 220° C., 120 grams of pumpkin seeds were put into the roaster, and were mixed with the coffee beans during roasting. The mixture was roasted for an additional 1.5 minutes while controlling the amount of heat in order to keep the product temperature at 200° C. The roasted mixture was discharged onto a cooling plate, and was cooled.

Example 17

Commercially-available dried chestnuts, from which the skins had been removed, were used. At this time, the water content was 6%. Subsequently, three kilograms of green coffee beans were roasted with a coffee roaster. Approximately 11 minutes later, when the product temperature of the coffee beans reached 220° C., 120 grams of chestnuts were put into the roaster, and were mixed with the coffee beans during roasting. The mixture was roasted for an additional 1.5 minutes while controlling the amount of heat in order to keep the product temperature at 200° C. The roasted mixture was discharged onto a cooling plate, and was cooled.

Example 18

Commercially-available dried walnuts were used. At this time, the water content was 8%. Subsequently, three kilograms of green coffee beans were roasted with a coffee roaster. Approximately 11 minutes later, when the product temperature of the coffee beans reached 220° C., 120 grams of walnuts were put into the roaster, and were mixed with the coffee beans during roasting. The mixture was roasted for an additional two minutes while controlling the amount of heat in order to keep the product temperature at 190° C. The roasted mixture was discharged onto a cooling plate, and was cooled.

Example 19

Commercially-available sesame seeds were used. At this time, the water content was 5%. Subsequently, three kilograms of green coffee beans were roasted with a coffee roaster. Approximately 11 minutes later, when the product temperature of the coffee beans reached 220° C., 120 grams of sesame seeds were put into the roaster, and were mixed with the coffee beans during roasting. The mixture was roasted for an additional two minutes while controlling the amount of heat in order to keep the product temperature at 210° C. The roasted mixture was discharged onto a cooling plate, and was cooled.

Example 20

Commercially-available dried sunflower seeds were used. At this time, the water content was 6%. Subsequently, three kilograms of green coffee beans were roasted with a coffee roaster. Approximately 11 minutes later, when the product temperature of the coffee beans reached 220° C., 120 grams of sunflower seeds were put into the roaster, and were mixed with the coffee beans during roasting. The mixture was roasted for an additional 1.5 minutes while controlling the amount of heat in order to keep the product temperature at 210° C. The roasted mixture was discharged onto a cooling plate, and was cooled.

Example 21

Commercially-available dried hazelnuts were used. At this time, the water content was 7%. Subsequently, three kilograms of green coffee beans were roasted with a coffee roaster. Approximately 11 minutes later, when the product temperature of the coffee beans reached 220° C., 120 grams of hazelnuts were put into the roaster, and were mixed with the coffee beans during roasting. The mixture was roasted for an additional 1.5 minutes while controlling the amount of heat in order to keep the product temperature at 210° C. The roasted mixture was discharged onto a cooling plate, and was cooled.

Example 22

Commercially-available dried pecan nuts were used. At this time, the water content was 7%. Subsequently, three kilograms of green coffee beans were roasted with a coffee roaster. Approximately 11 minutes later, when the product temperature of the coffee beans reached 220° C., 120 grams of pecan nuts were put into the roaster, and were mixed with the coffee beans during roasting. The mixture was roasted for an additional two minutes while controlling the amount of heat in order to keep the product temperature at 210° C. The roasted mixture was discharged onto a cooling plate, and was cooled.

Example 23

Commercially-available dried macadamia nuts were used. At this time, the water content was 7%. Subsequently, three kilograms of green coffee beans were roasted with a coffee roaster. Approximately 11 minutes later, when the product temperature of the coffee beans reached 220° C., 120 grams of macadamia nuts were put into the roaster, and were mixed with the coffee beans during roasting. The mixture was roasted for an additional two minutes while controlling the amount of heat in order to keep the product temperature at 210° C. The roasted mixture was discharged onto a cooling plate, and was cooled.

Example 24

Commercially-available dried pine nuts were used. At this time, the water content was 7%. Subsequently, three kilograms of green coffee beans were roasted with a coffee roaster. Approximately 11 minutes later, when the product temperature of the coffee beans reached 220° C., 120 grams of pine nuts were put into the roaster, and were mixed with the coffee beans during roasting. The mixture was roasted for an additional two minutes while controlling the amount of heat in order to keep the product temperature at 210° C. The roasted mixture was discharged onto a cooling plate, and was cooled.

Example 25

Commercially-available dried peanuts were used. At this time, the water content was 7%. Subsequently, three kilograms of green coffee beans were roasted with a coffee roaster. Approximately 11 minutes later, when the product temperature of the coffee beans reached 220° C., 120 grams of peanuts were put into the roaster, and were mixed with the coffee beans during roasting. The mixture was roasted for an additional three minutes while controlling the amount of heat in order to keep the product temperature at 210° C. The roasted mixture was discharged onto a cooling plate, and was cooled.

Example 26

Commercially-available dried barley was used. At this time, the water content was 10%. Subsequently, three kilograms of green coffee beans were roasted with a coffee roaster. Approximately 11 minutes later, when the product temperature of the coffee beans reached 220° C., 120 grams of barley was put into the roaster, and was mixed with the coffee beans during roasting. The mixture was roasted for an additional 1.5 minutes while controlling the amount of heat in order to keep the product temperature at 210° C. The roasted mixture was discharged onto a cooling plate, and was cooled.

Example 27

Commercially-available dried malt was used. At this time, the water content was 6%. Subsequently, three kilograms of green coffee beans were roasted with a coffee roaster. Approximately 11 minutes later, when the product temperature of the coffee beans reached 220° C., 120 grams of malt was put into the roaster, and was mixed with the coffee beans during roasting. The mixture was roasted for an additional two minutes while controlling the amount of heat in order to keep the product temperature at 205° C. The roasted mixture was discharged onto a cooling plate, and was cooled.

Example 28

Commercially-available dried buckwheat seeds, which had been threshed, were used. At this time, the water content was 8%. Subsequently, three kilograms of green coffee beans were roasted with a coffee roaster. Approximately 11 minutes later, when the product temperature of the coffee beans reached 220° C., 120 grams of buckwheat seeds were put into the roaster, and were mixed with the coffee beans during roasting. The mixture was roasted for an additional two minutes while controlling the amount of heat in order to keep the product temperature at 205° C. The roasted mixture was discharged onto a cooling plate, and was cooled.

Example 29

Commercially-available dried Job's tears seeds were used. At this time, the water content was 9%. Subsequently, three kilograms of green coffee beans were roasted with a coffee roaster. Approximately 11 minutes later, when the product temperature of the coffee beans reached 220° C., 120 grams of Job's tears seeds were put into the roaster, and were mixed with the coffee beans during roasting. The mixture was roasted for an additional two minutes while controlling the amount of heat in order to keep the product temperature at 205° C. The roasted mixture was discharged onto a cooling plate, and was cooled.

Example 30

Blueberries were subjected to a drying process in a shelf dryer. At this time, the water content was 15%. Subsequently, three kilograms of green coffee beans were roasted with a coffee roaster. Approximately 11 minutes later, when the product temperature of the coffee beans reached 220° C., 60 grams of dry-processed blueberries were put into the roaster, and were mixed with the coffee beans during roasting. The mixture was roasted for an additional three minutes while controlling the amount of heat in order to keep the product temperature at 190° C. The roasted mixture was discharged onto a cooling plate, and was cooled.

Example 31

Prunes were subjected to a drying process in a shelf dryer. At this time, the water content was 18%. Subsequently, three kilograms of green coffee beans were roasted with a coffee roaster. Approximately 11 minutes later, when the product temperature of the coffee beans reached 220° C., 60 grams of dry-processed prunes were put into the roaster, and were mixed with the coffee beans during roasting. The mixture was roasted for an additional four minutes while controlling the amount of heat in order to keep the product temperature at 190° C. The roasted mixture was discharged onto a cooling plate, and was cooled.

Example 32

Cherries were diced into cubes, 7 mm on each side, with a dicer. The diced cubes of the cherries were subjected to a drying process in a shelf dryer. At this time, the water content of the peels was 16%. Subsequently, three kilograms of green coffee beans were roasted with a coffee roaster. Approximately 11 minutes later, when the product temperature of the coffee beans reached 220° C., 60 grams of dry-processed cubes of the cherries were put into the roaster, and were mixed with the coffee beans during roasting. The mixture was roasted for an additional two minutes while controlling the amount of heat in order to keep the product temperature at 200° C. The roasted mixture thus obtained was discharged onto a cooling plate, and was cooled.

Example 33

The flesh of persimmons was diced into cubes, 7 mm on each side, with a dicer. The diced cubes of the flesh of the persimmons were subjected to a drying process in a shelf dryer. At this time, the water content of the peels was 15%. Subsequently, three kilograms of green coffee beans were roasted with a coffee roaster. Approximately 11 minutes later, when the product temperature of the coffee beans reached 220° C., 60 grams of dry-processed cubes of the flesh of the persimmons were put into the roaster, and were mixed with the coffee beans during roasting. The mixture was roasted for an additional three minutes while controlling the amount of heat in order to keep the product temperature at 200° C. The roasted mixture thus obtained was discharged onto a cooling plate, and was cooled.

Example 34

The flesh of pineapples was diced into cubes, 7 mm on each side, with a dicer. The diced cubes of the flesh of the pineapples were subjected to a drying process in a shelf dryer. At this time, the water content of the peels was 18%. Subsequently, three kilograms of green coffee beans were roasted with a coffee roaster. Approximately 11 minutes later, when the product temperature of the coffee beans reached 220° C., 60 grams of dry-processed cubes of the flesh of the pineapples were put into the roaster, and were mixed with the coffee beans during roasting. The mixture was roasted for an additional three minutes while controlling the amount of heat in order to keep the product temperature at 210° C. The roasted mixture thus obtained was discharged onto a cooling plate, and was cooled.

Example 35

The flesh of bananas was diced into cubes, 7 mm on each side, with a dicer. The diced cubes of the flesh of the bananas were subjected to a drying process in a shelf dryer. At this time, the water content of the peels was 14%. Subsequently, three kilograms of green coffee beans were roasted with a coffee roaster. Approximately 11 minutes later, when the product temperature of the coffee beans reached 220° C., 60 grams of dry-processed cubes of the flesh of the bananas were put into the roaster, and were mixed with the coffee beans during roasting. The mixture was roasted for an additional four minutes while controlling the amount of heat in order to keep the product temperature at 210° C. The roasted mixture thus obtained was discharged onto a cooling plate, and was cooled.

Example 36

Commercially-available dried grapes were used. At this time, the water content of the peels was 14%. Subsequently, three kilograms of green coffee beans were roasted with a coffee roaster. Approximately 11 minutes later, when the product temperature of the coffee beans reached 220° C., 60 grams of dried grapes were put into the roaster, and were mixed with the coffee beans during roasting. The mixture was roasted for an additional three minutes while controlling the amount of heat in order to keep the product temperature at 200° C. The roasted mixture thus obtained was discharged onto a cooling plate, and was cooled.

Example 37

The flesh of mangos was diced into cubes, 7 mm on each side, with a dicer. The diced cubes of the flesh of the mangos were subjected to a drying process in a shelf dryer. At this time, the water content of the peels was 14%. Subsequently, three kilograms of green coffee beans were roasted with a coffee roaster. Approximately 11 minutes later, when the product temperature of the coffee beans reached 220° C., 60 grams of dry-processed cubes of the flesh of the mangos were put into the roaster, and were mixed with the coffee beans during roasting. The mixture was roasted for an additional three minutes while controlling the amount of heat in order to keep the product temperature at 200° C. The roasted mixture thus obtained was discharged onto a cooling plate, and was cooled.

Example 38

The flesh of peaches was diced into cubes, 7 mm on each side, with a dicer. The diced cubes of the flesh of the peaches were subjected to a drying process in a shelf dryer. At this time, the water content of the peels was 15%. Subsequently, three kilograms of green coffee beans were roasted with a coffee roaster. Approximately 11 minutes later, when the product temperature of the coffee beans reached 220° C., 60 grams of dry-processed cubes of the flesh of the peaches were put into the roaster, and were mixed with the coffee beans during roasting. The mixture was roasted for an additional three minutes while controlling the amount of heat in order to keep the product temperature at 200° C. The roasted mixture thus obtained was discharged onto a cooling plate, and was cooled.

Example 39

The flesh of apples was diced into cubes, 7 mm on each side, with a dicer. The diced cubes of the flesh of the apples were subjected to a drying process in a shelf dryer. At this time, the water content of the peels was 16%. Subsequently, three kilograms of green coffee beans were roasted with a coffee roaster. Approximately 11 minutes later, when the product temperature of the coffee beans reached 220° C., 60 grams of dry-processed cubes of the flesh of the apples were put into the roaster, and were mixed with the coffee beans during roasting. The mixture was roasted for an additional four minutes while controlling the amount of heat in order to keep the product temperature at 190° C. The roasted mixture thus obtained was discharged onto a cooling plate, and was cooled.

Example 40

Commercially-available dried pepper was used. At this time, the water content was 5%. Subsequently, three kilograms of green coffee beans were roasted with a coffee roaster. Approximately 11 minutes later, when the product temperature of the coffee beans reached 220° C., 60 grams of pepper was put into the roaster, and was mixed with the coffee beans during roasting. The mixture was roasted for an additional four minutes while controlling the amount of heat in order to keep the product temperature at 180° C. The roasted mixture was discharged onto a cooling plate, and was cooled.

Example 41

Commercially-available dried red pepper was used. At this time, the water content was 3%. Subsequently, three kilograms of green coffee beans were roasted with a coffee roaster. Approximately 11 minutes later, when the product temperature of the coffee beans reached 220° C., 6 grams of red pepper was put into the roaster, and was mixed with the coffee beans during roasting. The mixture was roasted for an additional two minutes while controlling the amount of heat in order to keep the product temperature at 200° C. The roasted mixture was discharged onto a cooling plate, and was cooled.

Example 42

Sugar cane was cut into pieces, 7 mm on each side, with an ultrasonic cutter. The cut pieces of the sugar cane were subjected to a drying process in a shelf dryer. At this time, the water content of the peels was 15%. Subsequently, three kilograms of green coffee beans were roasted with a coffee roaster. Approximately 11 minutes later, when the product temperature of the coffee beans reached 220° C., 120 grams of dry-processed pieces of the sugar cane were put into the roaster, and were mixed with the coffee beans during roasting. The mixture was roasted for an additional three minutes while controlling the amount of heat in order to keep the product temperature at 200° C. The roasted mixture was discharged onto a cooling plate, and was cooled.

Example 43

Ginger was diced into cubes, 7 mm on each side, with a dicer. The diced cubes of the ginger were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 30 grams of dry-processed cubes of the ginger were put into the roaster, and were mixed with the coffee beans during roasting. The mixture was roasted for an additional three minutes while controlling the amount of heat in order to keep the product temperature at 210° C. The roasted mixture was discharged onto a cooling plate, and was cooled.

Example 44

Garlic was cut into pieces, 7 mm on each side, with an ultrasonic cutter. The cut pieces of the garlic were subjected to a drying process in a shelf dryer. At this time, the water content of the peels was 7%. Subsequently, three kilograms of green coffee beans were roasted with a coffee roaster. Approximately 11 minutes later, when the product temperature of the coffee beans reached 220° C., 15 grams of dry-processed pieces of the garlic were put into the roaster, and were mixed with the coffee beans during roasting. The mixture was roasted for an additional 6 minutes while controlling the amount of heat in order to keep the product temperature at 210° C. The roasted mixture was discharged onto a cooling plate, and was cooled.

Example 45

Onions were diced into cubes, 7 mm on each side, with a dicer. The diced cubes of the onions were subjected to a drying process in a shelf dryer. At this time, the water content of the peels was 10%. Subsequently, three kilograms of green coffee beans were roasted with a coffee roaster. Approximately 11 minutes later, when the product temperature of the coffee beans reached 220° C., 120 grams of dry-processed cubes of the onions were put into the roaster, and were mixed with the coffee beans during roasting. The mixture was roasted for an additional 6 minutes while controlling the amount of heat in order to keep the product temperature at 180° C. The roasted mixture was discharged onto a cooling plate, and was cooled.

Example 46

Carrots were diced into cubes, 7 mm on each side, with a dicer. The diced cubes of the carrots were subjected to a drying process in a shelf dryer. At this time, the water content of the peels was 11%. Subsequently, three kilograms of green coffee beans were roasted with a coffee roaster. Approximately 11 minutes later, when the product temperature of the coffee beans reached 220° C., 120 grams of dry-processed cubes of the carrots were put into the roaster, and were mixed with the coffee beans during roasting. The mixture was roasted for an additional 6 minutes while controlling the amount of heat in order to keep the product temperature at 200° C. The roasted mixture was discharged onto a cooling plate, and was cooled.

Example 47

Burdock was diced into cubes, 7 mm on each side, with a dicer. The diced cubes of the burdock were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 120 grams of dry-processed cubes of the burdock were put into the roaster, and were mixed with the coffee beans during roasting. The mixture was roasted for an additional four minutes while controlling the amount of heat in order to keep the product temperature at 200° C. The roasted mixture was discharged onto a cooling plate, and was cooled.

Example 48

Pumpkins were diced into cubes, 7 mm on each side, with a dicer. The diced cubes of the pumpkins were subjected to a drying process in a shelf dryer. At this time, the water content of the peels was 15%. Subsequently, three kilograms of green coffee beans were roasted with a coffee roaster. Approximately 11 minutes later, when the product temperature of the coffee beans reached 220° C., 120 grams of dry-processed cubes of the pumpkins were put into the roaster, and were mixed with the coffee beans during roasting. The mixture was roasted for an additional four minutes while controlling the amount of heat in order to keep the product temperature at 200° C. The roasted mixture was discharged onto a cooling plate, and was cooled.

Example 49

Commercially-available dried oolong tea was used. At this time, the water content was 2%. Subsequently, three kilograms of green coffee beans were roasted with a coffee roaster. Approximately 11 minutes later, when the product temperature of the coffee beans reached 220° C., 120 grams of oolong tea was put into the roaster, and was mixed with the coffee beans during roasting. The mixture was roasted for an additional two minutes while controlling the amount of heat in order for the product temperature not to rise or not to be kept, until the product temperature reached 190° C. The roasted mixture was discharged onto a cooling plate, and was cooled.

Example 50

Commercially-available dried pu'er tea was used. At this time, the water content was 2%. Subsequently, three kilograms of green coffee beans were roasted with a coffee roaster. Approximately 11 minutes later, when the product temperature of the coffee beans reached 220° C., 120 grams of pu'er tea was put into the roaster, and was mixed with the coffee beans during roasting. The mixture was roasted for an additional two minutes while controlling the amount of heat in order for the product temperature not to rise or not to be kept, until the product temperature reached 190° C. The roasted mixture was discharged onto a cooling plate, and was cooled.

Example 51

Commercially-available dried black tea was used. At this time, the water content was 2%. Subsequently, three kilograms of green coffee beans were roasted with a coffee roaster. Approximately 11 minutes later, when the product temperature of the coffee beans reached 220° C., 120 grams of black tea was put into the roaster, and was mixed with the coffee beans during roasting. The mixture was roasted for an additional two minutes while controlling the amount of heat in order for the product temperature not to rise or not to be kept, until the product temperature reached 190° C. The roasted mixture was discharged onto a cooling plate, and was cooled.

Example 52

As roses, their commercially-available dried petals were used. At this time, the water content was 2%. Subsequently, three kilograms of green coffee beans were roasted with a coffee roaster. Approximately 11 minutes later, when the product temperature of the coffee beans reached 220° C., 120 grams of dried rose petals were put into the roaster, and were mixed with the coffee beans during roasting. The mixture was roasted for an additional 0.5 minutes while controlling the amount of heat in order for the product temperature not to rise or not to be kept, until the product temperature reached 205° C. The roasted mixture was discharged onto a cooling plate, and was cooled.

Example 53

As jasmine, its commercially-available dried flowers were used. At this time, the water content was 2%. Subsequently, three kilograms of green coffee beans were roasted with a coffee roaster. Approximately 11 minutes later, when the product temperature of the coffee beans reached 220° C., 120 grams of dried jasmine flowers were put into the roaster, and were mixed with the coffee beans during roasting. The mixture was roasted for an additional 0.5 minutes while controlling the amount of heat in order for the product temperature not to rise or not to be kept, until the product temperature reached 205° C. The roasted mixture was discharged onto a cooling plate, and was cooled.

Example 54

Commercially-available dried hops were used. At this time, the water content was 3%. Subsequently, three kilograms of green coffee beans were roasted with a coffee roaster. Approximately 11 minutes later, when the product temperature of the coffee beans reached 220° C., 120 grams of dried hops were put into the roaster, and were mixed with the coffee beans during roasting. The mixture was roasted for an additional two minutes while controlling the amount of heat in order for the product temperature not to rise or not to be kept, until the product temperature reached 200° C. The roasted mixture was discharged onto a cooling plate, and was cooled.

Example 55

As hibiscuses, their commercially-available dried flowers were used. At this time, the water content was 3%. Subsequently, three kilograms of green coffee beans were roasted with a coffee roaster. Approximately 11 minutes later, when the product temperature of the coffee beans reached 220° C., 120 grams of dried hibiscus flowers were put into the roaster, and were mixed with the coffee beans during roasting. The mixture was roasted for an additional 0.5 minutes while controlling the amount of heat in order for the product temperature not to rise or not to be kept, until the product temperature reached 205° C. The roasted mixture was discharged onto a cooling plate, and was cooled.

Example 56

Commercially-available dried lemongrass was used. At this time, the water content was 3%. Subsequently, three kilograms of green coffee beans were roasted with a coffee roaster. Approximately 11 minutes later, when the product temperature of the coffee beans reached 220° C., 30 grams of dried lemongrass was put into the roaster, and was mixed with the coffee beans during roasting. The mixture was roasted for an additional three minutes while controlling the amount of heat in order for the product temperature not to rise or not to be kept, until the product temperature reached 185° C. The roasted mixture was discharged onto a cooling plate, and was cooled.

Example 57

Cured vanilla beans as being in pods were cut into pieces, 7 mm on each side, with an ultrasonic cutter. The resultant cut pieces of the cured vanilla beans were used. At this time, the water content was 18%. Subsequently, three kilograms of green coffee beans were roasted with a coffee roaster. Approximately 11 minutes later, when the product temperature of the coffee beans reached 220° C., 30 grams of dried pieces of the cured vanilla beans were put into the roaster, and were mixed with the coffee beans during roasting. The mixture was roasted for an additional two minutes while controlling the amount of heat in order for the product temperature not to rise or not to be kept, until the product temperature reached 190° C. The roasted mixture was discharged onto a cooling plate, and was cooled.

Examples 58

Commercially-available dried berries of sansho (Japanese pepper) were used. At this time, the water content was 5%. Subsequently, three kilograms of green coffee beans were roasted with a coffee roaster. Approximately 11 minutes later, when the product temperature of the coffee beans reached 220° C., 15 grams of dried berries of the sansho were put into the roaster, and were mixed with the coffee beans during roasting. The mixture was roasted for an additional two minutes while controlling the amount of heat in order for the product temperature not to rise or not to be kept, until the product temperature reached 200° C. The roasted mixture was discharged onto a cooling plate, and was cooled.

Examples 59

Commercially-available dried rosemary was used. At this time, the water content was 4%. Subsequently, three kilograms of green coffee beans were roasted with a coffee roaster. Approximately 11 minutes later, when the product temperature of the coffee beans reached 220° C., 15 grams of dried rosemary was put into the roaster, and was mixed with the coffee beans during roasting. The mixture was roasted for an additional 1.5 minutes while controlling the amount of heat in order for the product temperature not to rise or not to be kept, until the product temperature reached 195° C. The roasted mixture was discharged onto a cooling plate, and was cooled.

Example 60

Sugar beets were diced into cubes, 7 mm on each side, with a dicer. The diced cubes of the sugar beets were subjected to a drying process in a shelf dryer. At this time, the water content was 13%. Subsequently, three kilograms of green coffee beans were roasted with a coffee roaster. Approximately 11 minutes later, when the product temperature of the coffee beans reached 220° C., 120 grams of dry-processed cubes of the sugar beets were put into the roaster, and were mixed with the coffee beans during roasting. The mixture was roasted for an additional three minutes while controlling the amount of heat in order for the product temperature not to rise or not to be kept, until the product temperature reached 180° C. The roasted mixture was discharged onto a cooling plate, and was cooled.

Example 61

Commercially-available dried kelp was used. The kelp was cut into pieces, 7 mm on each side, with an ultrasonic cutter. At this time, the water content was 6%. Subsequently, three kilograms of green coffee beans were roasted with a coffee roaster. Approximately 11 minutes later, when the product temperature of the coffee beans reached 220° C., 60 grams of pieces of the dried kelp were put into the roaster, and were mixed with the coffee beans during roasting. The mixture was roasted for an additional 2.5 minutes while controlling the amount of heat in order for the product temperature not to rise or not to be kept, until the product temperature reached 190° C. The roasted mixture was discharged onto a cooling plate, and was cooled.

Example 62

Sweet potatoes were diced into cubes, 7 mm on each side, with a dicer. The diced cubes of the sweet potatoes were subjected to a drying process in a shelf dryer. At this time, the water content was 11%. Subsequently, three kilograms of green coffee beans were roasted with a coffee roaster. Approximately 11 minutes later, when the product temperature of the coffee beans reached 220° C., 120 grams of dry-processed cubes of the sweet potatoes were put into the roaster, and were mixed with the coffee beans during roasting. The mixture was roasted for an additional four minutes while controlling the amount of heat in order for the product temperature not to rise or not to be kept, until the product temperature reached 175° C. The roasted mixture was discharged onto a cooling plate, and was cooled.

Example 63

Potatoes were diced into cubes, 7 mm on each side, with a dicer. The diced cubes of the potatoes were subjected to a drying process in a shelf dryer. At this time, the water content was 11%. Subsequently, three kilograms of green coffee beans were roasted with a coffee roaster. Approximately 11 minutes later, when the product temperature of the coffee beans reached 220° C., 120 grams of dry-processed cubes of the potatoes were put into the roaster, and were mixed with the coffee beans during roasting. The mixture was roasted for an additional four minutes while controlling the amount of heat in order for the product temperature not to rise or not to be kept, until the product temperature reached 175° C. The roasted mixture was discharged onto a cooling plate, and was cooled.

Example 64

As corn, commercially-available dried kernels were used. At this time, the water content was 8%. Subsequently, three kilograms of green coffee beans were roasted with a coffee roaster. Approximately 8 minutes later, when the product temperature of the coffee beans reached 190° C., 120 grams of dried corn kernels were put into the roaster, and were mixed with the coffee beans during roasting. After mixed, the mixture was roasted for an additional three minutes while controlling the amount of heat in order for the product temperature of the mixture to rise, until the product temperature reached 220° C. The roasted mixture was discharged onto a cooling plate, and was cooled.

Example 65

Commercially-available dried pepper was used. At this time, the water content was 5%. Subsequently, three kilograms of green coffee beans were roasted with a coffee roaster. Approximately 8 minutes later, when the product temperature of the coffee beans reached 205° C., 60 grams of dried pepper was put into the roaster, and was mixed with the coffee beans during roasting. After mixed, the mixture was roasted for an additional two minutes while controlling the amount of heat in order for the product temperature of the mixture to rise, until the product temperature reached 220° C. The roasted mixture was discharged onto a cooling plate, and was cooled.

Example 66

Commercially-available dried red pepper was used. At this time, the water content was 3%. Subsequently, three kilograms of green coffee beans were roasted with a coffee roaster. Approximately 9 minutes later, when the product temperature of the coffee beans reached 205° C., 6 grams of dried red pepper was put into the roaster, and was mixed with the coffee beans during roasting. After mixed, the mixture was roasted for an additional two minutes while controlling the amount of heat in order for the product temperature of the mixture to rise, until the product temperature reached 220° C. The roasted mixture was discharged onto a cooling plate, and was cooled.

Example 67

Garlic was cut into pieces, 7 mm on each side, with an ultrasonic cutter. The cut pieces of the garlic were subjected to a shelf dryer. At this time, the water content was 7%. Subsequently, three kilograms of green coffee beans were roasted with a coffee roaster. Approximately 9 minutes later, when the product temperature of the coffee beans reached 205° C., 15 grams of dry-processed pieces of the garlic were put into the roaster, and were mixed with the coffee beans during roasting. After mixed, the mixture was roasted for an additional two minutes while controlling the amount of heat in order for the product temperature of the mixture to rise, until the product temperature reached 220° C. The roasted mixture was discharged onto a cooling plate, and was cooled.

Example 68

Rice was subjected to a wetting process by: soaking the rice in water for 30 minutes; and subsequently steaming the rice for one hour. Thereafter, the resultant rice was subjected to a drying process in a shelf dryer. At this time, the water content was 18%. Subsequently, three kilograms of green coffee beans were roasted with a coffee roaster. Approximately 9 minutes later, when the product temperature of the coffee beans reached 205° C., 120 grams of dry-processed rice was put into the roaster, and was mixed with the coffee beans during roasting. After mixed, the mixture was roasted for an additional two minutes while controlling the amount of heat in order for the product temperature of the mixture to rise, until the product temperature reached 220° C. The roasted mixture was discharged onto a cooling plate, and was cooled.

Reference Example

Three kilograms of green coffee beans were roasted in a coffee roaster by a conventional method. Approximately 11 minutes later, when the product temperature of the coffee beans reached 220° C., the roasted coffee beans were discharged onto a cooling plate, and were cooled.

Comparative Examples 1 to 68

For each material, its roasted matter was obtained by roasting the material under the same heating condition as the corresponding one of the roasted mixtures of Examples 1 to 68 was roasted after the mixture. Subsequently, roasted coffee beans were obtained by the method which has been mentioned as the reference example. Thereafter, for each material, the mixture was obtained by blending its roasted matter and the roasted coffee beans in the same mixture ratio as the corresponding one of the roasted mixtures of Examples 1 to 68 was blended.

(Evaluation of Characteristics of Extract of Each Roasted Mixture)

After cooled in a refrigerator at approximately 10° C., the roasted mixture obtained in each of Examples 1 to 68, the roasted coffee beans obtained in Reference Example, and the mixture of the roasted coffee beans and the roasted matter obtained in each of Comparative Examples 1 to 68 were ground with a coffee mill. 1300 grams of extract was obtained by extracting from 100 grams of each ground material with boiling water at atmospheric pressure.

20 testers evaluated how the coffee characteristics of each extract thus obtained was different from those of the extract from the roasted coffee beans obtained in Reference Example. Each tester gave one point to each extract when he/she evaluated the extract became very weak in the coffee characteristics in comparison with the extract from the roasted coffee beans obtained in Reference Example; two points when he/she evaluated the extract became weak; three points when he/she evaluated the extract remained unchanged; four points when he/she evaluated the extract became strong; and five points when he/she evaluated the extract became very strong. The rating of each extract was based on an average of points given by the testers. Incidentally, the evaluation terms conformed to Japan Coffee Qualification Textbook, published by the National Coffee Roasters Association of Japan. The evaluation results are shown in Table 1, which are given below, and FIGS. 1(a) to 9.

TABLE 1

| Example | Material to be Mixed and Roasted with Coffee Beans | Enhanced Characteristics | Comments from Testers |
|---|---|---|---|
| 1 | Grapefruit peels | Acidity | Acidity is strong. There is sense of body, but taste is light. |
| 2 | Mandarin Orenge peels | Acidity | |
| 3 | Orange peels | Acidity | Acidity is strong. Sweetness and sense of fresh are strong. |
| 4 | Peels of kabosu | Acidity | |
| 5 | Peels of sudachi | Acidity | |
| 6 | Peels of yuzu | Acidity, Floral | |
| 7 | Lime peels | Acidity, Floral | |
| 8 | Lemon peels | Acidity | Acidity and freshness are increased sharply. |
| 9 | Adzuki beans | Aroma | |
| 10 | Kidney beans | Aroma | |
| 11 | Peas | Aroma | |
| 12 | Soybeans | Aroma, Body | Aromatic fragrance is strong. Thick taste. |
| 13 | Almonds | Aroma, Body | Roast odor with sweetness is excellent. Rich sense of body with sweetness. |
| 14 | Cashew nuts | Aroma, Body | |
| 15 | Seeds of Japanese horse chestnuts | Aroma | |
| 16 | Pumpkin seeds | Aroma | |
| 17 | Chestnuts | Aroma, Body | |
| 18 | Walnuts | Aroma, Body | Aromatic roast fragrance. Aroma increases sense of body. |

TABLE 1-continued

| Example | Material to be Mixed and Roasted with Coffee Beans | Enhanced Characteristics | Comments from Testers |
|---|---|---|---|
| 19 | Sesame seeds | Body, Sweetness | Rich taste. Excellent body. |
| 20 | Sunflower seeds | Aroma, Body | |
| 21 | Hazelnuts | Aroma, Body | |
| 22 | Pecan nuts | Aroma, Body | Aroma with aromatic sense of roast. Full body. |
| 23 | *Macadamia nuts* | Aroma, Body | |
| 24 | Pine nuts | Aroma, Body | |
| 25 | Peanuts | Aroma, Body | Sweet and aromatic aroma. Rich body. Taste like caramel. |
| 26 | Barley | Aroma | |
| 27 | Malt | Aroma | Crisp bitter aroma. Soft bitter body. |
| 28 | Buckwheat seeds | Aroma | |
| 29 | Job's tears seeds | Aroma | |
| 30 | Blueberries | Body, Acidity | Sense of acidity like high-grade green beans. |
| 31 | Prunes | Body | |
| 32 | Cherries | Fresh, Acidity | |
| 33 | Persimmons | Fresh, Sweetness | |
| 34 | Pineapples | Fresh, Acidity | Crisp sourness like *Arabica* grown at high altitude. |
| 35 | Bananas | Fresh, Aroma | |
| 36 | Grapes | Fresh, Body | |
| 37 | Mangos | Fresh, Body | Sourness like high-grade green beans. |
| 38 | Peaches | Fresh, Body | |
| 39 | Apples | Fresh, Body | Having body unique to high-grade green beans. |
| 40 | Pepper | Spicy | Top roast fragrance is strong. Top taste feels strong. |
| 41 | Red pepper | Sweetness, Body | Roast fragrance like nuts. Top sweetness is strong and sense of body continues. There is no sense of pungency. |
| 42 | Sugar cane | Aroma, Sweetness | Roast fragrance like caramel. |
| 43 | Ginger | Body, Cleanness | Light taste but thick body. |
| 44 | Garlic | Sweetness, Body | Full body. |

TABLE 1-continued

| Example | Material to be Mixed and Roasted with Coffee Beans | Enhanced Characteristics | Comments from Testers |
|---|---|---|---|
| 45 | Onions | Sweetness, Body | Taste with great sense of roast. |
| 46 | Carrots | Sweetness | |
| 47 | Burdock | Aroma, Body | Roast fragrance and body with sense of roast. |
| 48 | Pumpkins | Sweetness | |
| 49 | Oolong tea | Cleanness | Only cleanness is increased. There is no influence on others. |
| 50 | Pu'er tea | Cleanness, Floral | |
| 51 | Black tea | Cleanness, Floral | Light taste and excellent crispness. |
| 52 | Roses | Floral | |
| 53 | Jasmine | Floral | Floral taste and having overall sense of volume and crispness. |
| 54 | Hops | Cleanness, Floral | |
| 55 | Hibiscuses | Floral | |
| 56 | Lemongrass | Acidity, Cleanness | |
| 57 | Vanilla | Sweetness, Body | Light sweetness unique to coffee is increased. |
| 58 | Berries of sansho (Japanese pepper) | Spicy | |
| 59 | Rosemary | Aroma, Body | |
| 60 | Sugar beets | Sweetness, Aroma | |
| 61 | Kelps | Body | Taste feels thick. |
| 62 | Sweet potatoes | Sweetness, Body | Sweet body like caramel suggesting high-quality dark roasted beans. |
| 63 | Potatoes | Sweetness, Body | Sweet body like caramel suggesting high-quality dark roasted beans. |
| 64 | Corn | Aroma | Sweet fragrance. Sweetness is strong, and sense of body is thick. |
| 65 | Pepper | Spicy, Aroma | |
| 66 | Red pepper | Body, Aroma, Sweetness | |
| 67 | Garlic | Sweetness, Body | Full body. |
| 68 | Rice | Aroma | Aromatic aroma. Aroma increases sense of body. |

Comparative Example 69

Grapefruit peels were cut into pieces, 7 mm on each side, with an ultrasonic cutter. The cut pieces of the peels were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 150 grams of dry-processed pieces of the grapefruit peels were put into the roaster, and were mixed with the coffee beans during roasting. The mixture was roasted for an additional three minutes while controlling the amount of heat in order to keep the product temperature at 210° C. The roasted mixture was discharged onto a cooling plate, and was cooled.

Figure 10:
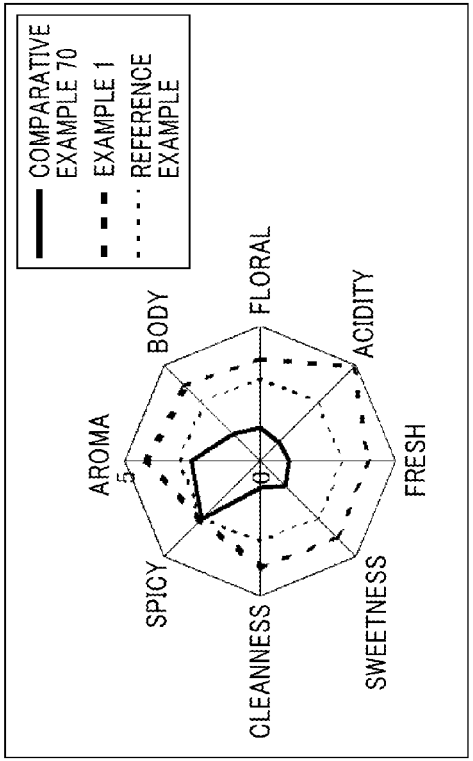
FIG. 10 shows evaluations of the characteristics of extracts obtained from roasted mixtures of Example 1, Reference Example, and Comparative Example 69.

Example 1, Reference Example, Comparative Example 69 were evaluated by the method which has been described in the section titled "Evaluation of Characteristics of Extract of Each Roasted Mixture." Acidity, one of the coffee characteristics, was enhanced in the roasted mixture of Example 1. On the contrary, acidity and other coffee characteristics were deteriorated in the roasted mixture of Comparative Example 69. The results are shown in FIG. 10.

Comparative Example 70

Grapefruit peels were cut into pieces, 7 mm on each side, with an ultrasonic cutter. The cut pieces of the peels were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 120 grams of dry-processed pieces of the grapefruit peels were put into the roaster, and were mixed with the coffee beans during roasting during roasting. The mixture was roasted for an additional 10.5 minutes while controlling the amount of heat in order to keep the product temperature at 210° C. The roasted mixture was discharged onto a cooling plate, and was cooled.

Figure 11:
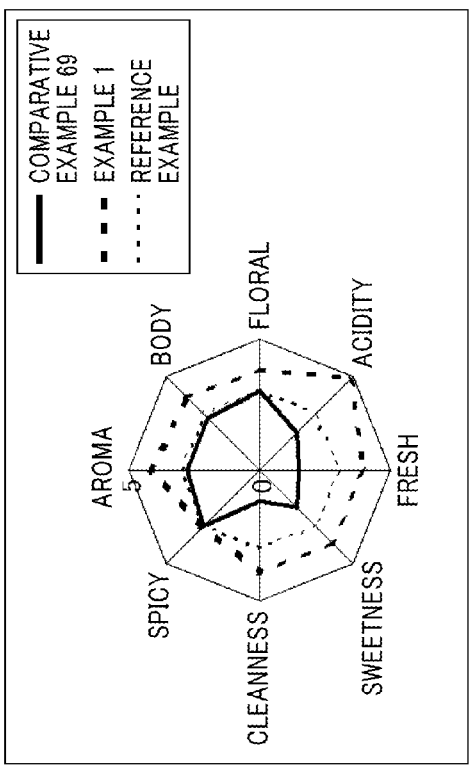
FIG. 11 shows evaluations of the characteristics of extracts obtained from roasted mixtures of Example 1, Reference Example, and Comparative Example 70.

Example 1, Reference Example, Comparative Example 70 were evaluated by the method which has been described in the section titled "Evaluation of Characteristics of Extract of Each Roasted Mixture." Acidity, one of the coffee characteristics, was enhanced in the roasted mixture of Example 1. On the contrary, acidity and most other coffee characteristics were deteriorated in the roasted mixture of Comparative Example 70, because the roasting time after the mixing was too long. The results are shown in FIG. 11.

Comparative Example 71

Grapefruit peels were cut into pieces, 7 mm on each side, with an ultrasonic cutter. The cut pieces of the peels were subjected to a drying process in a shelf dryer. At this time, the water content of the peels was 13%. Subsequently, three kilograms of green coffee beans were roasted with a coffee roaster. Approximately 11 minutes later, when the product temperature of the coffee beans reached 220° C., 120 grams of dry-processed pieces of the grapefruit peels were put into the roaster, and were mixed with the coffee beans during roasting. The mixture was roasted for an additional three minutes while controlling the amount of heat in order for the product temperature not to rise or not to be kept, until the product temperature reached 190° C. The roasted mixture was discharged onto a cooling plate, and was cooled.

Comparative Example 72

Grapefruit peels were cut into pieces, 7 mm on each side, with an ultrasonic cutter. The cut pieces of the peels were subjected to a drying process in a shelf dryer. At this time, the water content of the peels was 13%. Subsequently, three kilograms of green coffee beans were roasted with a coffee roaster. Approximately 9 minutes later, when the product temperature of the coffee beans reached 205° C., 120 grams of dry-processed pieces of the grapefruit peels were put into the roaster, and were mixed with the coffee beans during roasting. After mixed, the mixture was roasted for an additional two minutes while controlling the amount of heat in order for the product temperature of the mixture to rise, until the product temperature reached 220° C. The roasted mixture was discharged onto a cooling plate, and was cooled.

Figure 12:
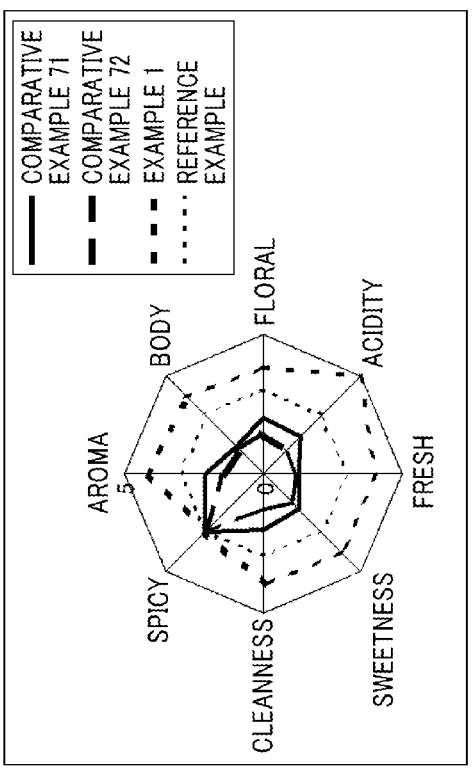
FIG. 12 shows evaluations of the characteristics of extracts obtained from roasted mixtures of Example 1, Reference Example, and Comparative Examples 71 and 72.

Example 1, Reference Example, as well as Comparative Examples 71 and 72 were evaluated by the method which has been described in the section titled "Evaluation of Characteristics of Extract of Each Roasted Mixture." Acidity, one of the coffee characteristics, was enhanced in the roasted mixture of Example 1. On the contrary, acidity and most other coffee characteristics were deteriorated in the roasted mixture of Comparative Example 71, because the amount of heat was too small. In addition, acidity and most other coffee characteristics were deteriorated in the roasted mixture of Comparative Example 72, because the amount of heat was too large. The results are shown in FIG. 12.

Comparative Examples 73 to 78

Flesh of grapefruits (Comparative Example 73), flesh of oranges (Comparative Example 74), flesh of lemons (Comparative Example 75), flesh of apricots (Comparative Example 76), strawberries (Comparative Example 77), nameko mushrooms (Comparative Examples 78) were selected as materials to be mixed and roasted with coffee beans. Roasted mixtures were obtained by roasting the respective materials and coffee beans by using a preparation process, a roasting method, a mixture ratio mentioned in Table 2 given below. Comparative Examples 73 to 78 were evaluated by using the method which has been described in the section titled "Evaluation of Characteristics of Extract of Each Roasted Mixture." The results of Comparative Examples 73 to 78 are shown in Table 2. The results in Table 2 show that no roasted mixture was able to be obtained from the coffee beans and any material in Comparative Examples 73 to 78 because, after mixed, the mixture turned into a paste in the course of the roasting process and resultantly became no longer able to be roasted.

TABLE 2

| Comparative Example | Material to be Mixed and Roasted with Coffee Beans | Roasting Method | Mixture Ratio (%) | Preparation Process | Roasting Results |
|---|---|---|---|---|---|
| 73 | Flesh of grapefruits | 2 | 2 | Drying process (water content 18%) | Roasting is impossible |
| 74 | Flesh of oranges | 2 | 2 | Drying process (water content 19%) | Roasting is impossible |
| 75 | Flesh of lemons | 2 | 2 | Drying process (water content 18%) | Roasting is impossible |
| 76 | Flesh of apricots | 2 | 2 | Drying process (water content 18%) | Roasting is impossible |
| 77 | Strawberries | 2 | 2 | Drying process (water content 19%) | Roasting is impossible |
| 78 | Nameko mushrooms | 2 | 2 | — | Roasting is impossible |

Comparative Examples 79 to 95

Cacao seeds (Comparative Example 79), fruit of ume (Japanese apricot) (Comparative Example 80), green tea (Comparative Example 81), leaves of sansho (Comparative Example 82), mint (Comparative Example 83), parsley (Comparative Example 84), shiso (*Perilla frutescens* var. *aceta*) (Comparative Example 85), celery (Comparative Example 86), bell peppers (Comparative Example 87), tomatoes (Comparative Examples 88), shiitake mushrooms (Comparative Examples 89), kikurage mushrooms (Comparative Example 90), maitake mushrooms (Comparative Example 91), enoki mushrooms (Comparative Example 92), wakame seaweed (Comparative Example 93), laver (Comparative Example 94) and taros (Comparative Example 95) were selected as materials to be mixed and roasted with coffee beans. Roasted mixtures were obtained by roasting the respective materials and coffee beans by using a preparation process, a roasting method, a mixture ratio mentioned in Table 3 given below. Comparative Examples 79 to 95 were evaluated by using the method which has been described in the section titled "Evaluation of Characteristics of Extract of Each Roasted Mixture." The results of Comparative Examples 79 to 95 are shown in Table 3. The results in Table 3 show that the combinations of the coffee beans and the materials did not enhance the coffee characteristics because the flavor was not satisfactory although the roasted mixture was obtained from the combinations.

TABLE 3

| Comparative Example | Material to be Mixed and Roasted with Coffee Beans | Roasting Method | Mixture Ratio (%) | Roasting Time | Preparation Process | Roasting Results |
|---|---|---|---|---|---|---|
| 79 | Cacao seeds | 2 | 2 | 4 | Cacao nib processed product (water content 9%) | Flavor is not desirable |
| 80 | Fruit of ume (Japanese apricot) | 2 | 2 | 2 | Drying process (water content 15%) | Flavor is not desirable |
| 81 | Green tea | 1 | 2 | 2 | Dry product is used (water content 3%) | Flavor is not desirable |
| 82 | Leaves of sansho | 1 | 1 | 2 | Dry product is used (water content 3%) | Flavor is not desirable |
| 83 | Mint | 1 | 1 | 2 | Dry product is used (water content 3%) | Flavor is not desirable |
| 84 | Parsley | 1 | 1 | 2 | Dry product is used (water content 2%) | Flavor is not desirable |
| 85 | Shiso | 1 | 1 | 2 | Dry product is used (water content 2%) | Flavor is not desirable |
| 86 | Celery | 1 | 1 | 2 | Drying process (water content 11%) | Flavor is not desirable |
| 87 | Bell peppers | 1 | 1 | 2 | Drying process (water content 9%) | Flavor is not desirable |
| 88 | Tomatoes | 2 | 2 | 2 | Dry product is used (water content 10%) | Flavor is not desirable |
| 89 | Shiitake mushrooms | 1 | 2 | 3 | Dry product is used (water content 5%) | Flavor is not desirable |
| 90 | Kikurage mushrooms | 1 | 2 | 3 | Dry product is used (water content 3%) | Flavor is not desirable |
| 91 | Maitake mushrooms | 1 | 2 | 3 | Drying process (water content 9%) | Flavor is not desirable |
| 92 | Enoki mushrooms | 1 | 2 | 3 | Drying process (water content 8%) | Flavor is not desirable |
| 93 | Wakame seaweed | 1 | 2 | 1 | Dry product is used (water content 3%) | Flavor is not desirable |
| 94 | Laver | 1 | 1 | 1 | Dry product is used (water content 2%) | Flavor is not desirable |
| 95 | Taros | 2 | 2 | 4 | Drying process (water content 14%) | Flavor is not desirable |

The present invention makes it possible to obtain coffee extracts with enhanced coffee characteristics which have been difficult to obtain. In other words, the present invention can provide coffee extracts with enhanced coffee characters by roasting particular materials and coffee beans in particular conditions.

The invention claimed is:

1. A roasted mixture consisting of roasted coffee beans and at least one roasted another material, said another material being selected from the group consisting of roses, jasmine, hops, hibiscuses, lemongrass, berries of sansho (Japanese pepper), rosemary, vanilla, pepper, red pepper, ginger, and garlic,
  wherein the roasted mixture is made through a process of roasting a mixture of coffee beans and the at least one another material, said another material having a water content 20 mass percent or less before being roasted.

2. The roasted mixture of claim 1, wherein an amount of the material is less than 5 mass percent.

3. The roasted mixture of claim 1, wherein the another material is mixed with the coffee beans while the coffee beans are being roasted.

4. The roasted mixture of claim 3, wherein after the material is mixed, the roasting is performed by heating in order to keep a temperature of the mixture in a range of 180 to 250° C.

5. The roasted mixture of claim 3, wherein roasting duration after the material is mixed is from 0.5 to 10 minutes inclusive.

6. An extract obtained by extracting from the roasted mixture of claim 1.

7. The roasted mixture of claim 4, wherein roasting duration after the material is mixed is from 1.5 to 6 minutes inclusive.

8. The roasted mixture of claim 3, wherein after the material is mixed, the roasting is performed by heating in order to keep a temperature of the mixture in a range of 175 to 220° C. without raising or decreasing the temperature 1.5 to 6 minutes.

9. The roasted mixture of claim 1, wherein the another material having a water content of 14% by mass or less, before being roasted.

10. The roasted mixture of claim 3, wherein the another material is mixed with the coffee beans while coffee beans are being roasted, after the coffee beans are roasted for 5-16 minutes inclusive at a temperature of 160-250° C.

11. A method for producing a beverage comprising adding the extract of claim 6 to the beverage.

* * * * *